US005983733A

United States Patent [19]

Strandberg et al.

[11] Patent Number: 5,983,733

[45] Date of Patent: Nov. 16, 1999

[54] MANUAL PIPETTE

[75] Inventors: Victor C. Strandberg, Carson City, Nev.; Robert F. Scalese; Phillip C. Trenholme, both of Truckee, Calif.; Jan M. Conover, Reno, Nev.; Scott T. Kozel, Verdi, Nev.; Chih C. Chen; Daniel J. Driscoll, both of Reno, Nev.

[73] Assignee: Hamilton Company, Reno, Nev.

[21] Appl. No.: 08/749,514

[22] Filed: Nov. 15, 1996

[51] Int. Cl.[6] ................................ B01L 3/02; G01N 1/14

[52] U.S. Cl. .................................... 73/864.11; 73/863.32; 73/864.13; 73/864.14; 73/864.17; 73/1.74; 73/864.18

[58] Field of Search ............................ 73/864.01, 864.14, 73/864.18, 864.11, 864.13, 864.16, 864.17, 174, 863.32; 422/100, 922, 923, 925, 927, 928, 932; 436/180

[56] References Cited

U.S. PATENT DOCUMENTS

| | | | |
|---|---|---|---|
| 3,646,817 | 3/1972 | Hinchman et al. | 73/864.18 X |
| 3,945,254 | 3/1976 | Rebold | 73/864.14 |
| 4,020,698 | 5/1977 | Marteau d'Autry | 73/864.18 |
| 4,096,750 | 6/1978 | Sturm . | |
| 4,154,108 | 5/1979 | Vøllinger . | |
| 4,197,735 | 4/1980 | Munzer et al. | 422/100 X |
| 4,283,950 | 8/1981 | Tervamäki | 73/864.14 |
| 4,444,062 | 4/1984 | Bennett et al. | 73/863.32 |
| 4,474,071 | 10/1984 | Marteau d'Autry | 73/864.13 |
| 4,487,081 | 12/1984 | De Vaughn et al. | 73/864.13 |
| 4,517,850 | 5/1985 | Wiseman et al. | 73/864.21 |
| 4,567,780 | 2/1986 | Oppenlander et al. | 73/864.16 |
| 4,586,546 | 5/1986 | Mezei et al. | 141/2 |
| 4,616,514 | 10/1986 | Magnussen, Jr. | 73/864.14 |
| 4,617,016 | 10/1986 | Blomberg | 604/155 |
| 4,671,123 | 6/1987 | Magnussen, Jr. et al. | 73/864.16 |
| 4,672,857 | 6/1987 | MacDermott | 73/864.18 |
| 4,779,467 | 10/1988 | Rainin et al. | 73/863.32 X |
| 4,821,586 | 4/1989 | Scordato et al. | 73/864.18 |
| 4,896,270 | 1/1990 | Kalmakis et al. | 364/479 |
| 4,905,526 | 3/1990 | Magnussen, Jr. et al. | 73/864.18 |
| 4,967,604 | 11/1990 | Arpagaus et al. | 73/864.13 |
| 5,021,217 | 6/1991 | Oshikubo | 73/863.32 X |
| 5,061,639 | 10/1991 | Lung et al. | 422/100 X |
| 5,187,990 | 2/1993 | Magnussen, Jr. et al. | 73/864.18 |

(List continued on next page.)

FOREIGN PATENT DOCUMENTS

| | | | |
|---|---|---|---|
| 14120 | 8/1980 | European Pat. Off. | 73/864.13 |
| 0078724 | 5/1983 | European Pat. Off. . | |
| 0428500 | 5/1991 | European Pat. Off. . | |
| 0152120 | 7/1992 | European Pat. Off. . | |
| 2071052 | 9/1971 | France . | |
| 2502330 | 9/1982 | France | 73/864.16 |
| 2700096 | 10/1977 | Germany | 73/863.32 |
| 2736551 | 3/1978 | Germany . | |
| 2651333 | 5/1978 | Germany . | |
| 2711124 | 9/1978 | Germany | 73/864.13 |
| 2029723 | 3/1980 | United Kingdom | 73/864.13 |
| 5609 | 5/1991 | WIPO | 73/864.13 |

OTHER PUBLICATIONS

BrandTech Scientific, Inc., "The Shape Of Things To Come Is Here: New Transferpette® From BrandTech", date unknown, three pages (not numbered). By Jan. 1988.

Brinkmann, "Brinkmann Laboratory Products, 97/98", 1997, pp. 1, 128 through 132, and 135. Month not given.

Brinkmann, "Transferpette™ 8/12", date unknown, one page (not numbered). By Jan. 1988.

(List continued on next page.)

*Primary Examiner*—Thomas P. Noland
*Attorney, Agent, or Firm*—Bernhard Kreten

[57] ABSTRACT

A manual pipette having a cushioned hand grip area and a tip ejector. The ejector is located strategically so that an operator can easily manipulate either the ejector or a pipette fluid plunger which introduces and expels fluid to be sampled. The pipette is ergonomically balanced and designed to prevent operator fatigue. The pipette includes structure for in field calibration and volume variation.

66 Claims, 15 Drawing Sheets

U.S. PATENT DOCUMENTS

| | | | |
|---|---|---|---|
| 5,192,511 | 3/1993 | Roach | 422/100 |
| 5,320,810 | 6/1994 | Al-Mahareeq et al. | 73/864.13 X |
| 5,347,878 | 9/1994 | Suovaniemi | 73/864.18 |
| 5,355,738 | 10/1994 | Heinonen | 73/864.13 |
| 5,364,595 | 11/1994 | Smith | 422/100 |
| 5,364,596 | 11/1994 | Magnussen, Jr. | 422/100 |
| 5,392,914 | 2/1995 | Lemieux et al. | 206/499 |
| 5,445,797 | 8/1995 | Flesher | 73/864.11 X |

OTHER PUBLICATIONS

Costar, "Pipettors", date unknown, three pages (not numbered). By Jan. 1988.

Eppendorf, "Adjustable–Volume Pipettes", date unknown, one page (not numbered). By Jan. 1998.

Eppendorf, "Eppendorf Series 2000 Reference Fixed–Volume, Instruction Manual", date unknown, pages 1 through 25. Plus final page by Jan. 1998.

Eppendorf, "Eppendorf Unipette 3190, Instruction Manual", date unknown, pages 1 and 12 through 23. By Jan. 1998.

Eppendorf, "Fixed–Volume Pipettes", date unknown, one page, one page (not numbered). By Jan. 1998.

Gilson, "High Precision Pipettes", date unknown, three pages (not numbered). By Jan. 1998.

Integrapette, "Continuously Adjustable Pipettes, I–Series Pipettes", date unknown, one page (not numbered). By Jan. 1998.

Labsystems, "Finnpipettes®& Finntips® Catalog, 1996–1997", pp. 1, 4, 7, and 19. Month not given.

Labsystems, "Finnpipette® Fixed Volume", date unknown, pp. 1 through 9 and 30 through 31 & final page by Jan. 1998.

Labsystems, "Finnpipette®", date unknown, two page brochure. By Jan. 1998.

Matrix Technologies Corporation, "Technologies For Liquid Handling, 1996 Product Catalog", 1996, three pages (not numbered). Month not given.

Oxford Labware, "Oxford BenchMate®, Continuously Adjustable Pipette", 1994, three pages (not numbered). Month not given.

Rainin Instrument Co., Inc., "Instructions for Pipetman®, Continuously Adjustable Digital Microliter Pipettes", 1982, twenty–eight page brochure. (pp. 1–27 & Cover).

Rainin Instrument Co., Inc., "Pipetman® Care and Maintenance, Complete Guide To Trouble Shooting And Repairing Pipetman Pipettes Models P–2 Through P–10ML and P–200–M8", 1994, Month not Given cover & pp. 3–14.

Socorex, "Calibra® 822, Digital Micropipette", date unknown, but by Jan. 1998 two pages (not numbered).

Wheaton, "Micropipettes With Precision Micrometer", Jan. 1995, five pages (not numbered).

Rainin Instrument Company; Rainin Product Update; Mar., 1996 issue; entire issue pp. 1–24.

Fall Winter BioConsumer Review; 1996 issue; Powered; Katharine Glover, Ph.D. entire article (pages 12–14) Photo copied Dec. 1, 1995.

*Patent Abstracts of Europe* "Pipette" (EP 0004131A1) dated Dec. 9, 1981 by Osmo Suovaniemi.

*Patent Abstracts of Europe* "Dispensing Pipette and Method for Manufacturing It" (CH 00650416A) dated Jul. 31, 1985 by Eberle.

*Patent Abstracts of Europe* "Pipette" (EP 00348612A2) dated Jan. 3, 1990 by Wojciech Sarna.

| Fig. 2A |
| --- |
| Fig. 2B |

MANUAL PIPETTE

FIELD OF THE INVENTION

The invention relates generally to instrumentalities which transfer precise amounts of fluid from one vessel to another. More particularly, the instant invention is directed to a manual pipette which relies upon displacement of a piston for fluid transfer. Further, the instant invention is directed to a pipette in which the quantum of fluid capable of being transferred by the pipette is either a fixed volume or variable volume. The pipette can be configured to transfer a single volume of fluid (a single channel unit) or multiple volumes of fluid (multiple channel units).

BACKGROUND OF THE INVENTION

Pipettes have evolved from relatively simple straw-type structures to sophisticated electronic hand-held devices which exhibit a great degree of precision.

Typically, for a technician in a laboratory environment, pipetting may occupy only some, but as much as all of the technician's time during the course of employment. The work done by the technician requires great accuracy, and precision pipettes have made chemical assays accurate and reproducible. But, frequently this precision can come at the expense of the technician's physical constitution when the technician must perform repetitive tasks over protracted periods of time using cumbersome equipment.

Carpal Tunnel Syndrome is now a recognized malady that can be traced to the prolonged use of prior art pipettes. Factors found to have a deleterious effect on the physiology of the pipette user include excessive weight of the pipette, a contour which does not lend itself to easily grasping the pipette, requirements of unnatural motion of the digits of the hand manipulating the pipette, and asymmetry of the pipette device mandating deployment only by one hand, thereby giving the technician no opportunity to "load-shift" by switching hands.

The following prior art reflects the state of the art of which applicant is aware and is included herewith to discharge applicant's acknowledged duty to disclose relevant prior art. It is respectfully stipulated, however, that none of these references teach singly nor when considered in any conceivable combination teach the nexus of the instant invention as particularly set forth and claimed hereinafter.

| PATENT NO. | ISSUE DATE | INVENTOR |
|---|---|---|
| | U.S. PATENT DOCUMENTS | |
| 4,096,750 | June 27, 1978 | Sturm |
| 4,154,108 | May 15, 1979 | Völlinger, et al. |
| 4,197,735 | April 15, 1980 | Munzer, et al. |
| 4,474,071 | October 2, 1984 | Marteau d'Autry |
| 4,487,081 | December 11, 1984 | De Vaughn, et al. |
| 4,517,850 | May 21, 1985 | Wiseman, et al. |
| 4,567,780 | February 4, 1986 | Oppenlander, et al. |
| 4,586,546 | May 6, 1986 | Mezei, et al. |
| 4,6i6,5i4 | October 14, 1986 | Magnussen, Jr., et al. |
| 4,6i7,0i6 | October 14, 1986 | Blomberg |
| 4,671,123 | June 9, 1987 | Magnussen, Jr., et al. |
| 4,821,586 | April 18, 1989 | Scordato, et al. |
| 4,896,270 | January 23, 1990 | Kaimakis, et al. |
| 4,905,526 | March 6, 1990 | Magnussen, Jr., et al. |
| 4,967,604 | November 6, 1990 | Arpagaus, et al. |
| 5,187,990 | February 23, 1993 | Magnussen, Jr., et al. |
| 5,192,511 | March 9, 1993 | Roach |
| 5,347,878 | September 20, 1994 | Suovaniemi |
| 5,355,738 | October 18, 1994 | Heinonen |

-continued

| PATENT NO. | ISSUE DATE | INVENTOR |
|---|---|---|
| 5,364,595 | November 15, 1994 | Smith |
| 5,364,596 | November 15, 1994 | Magnussen, Jr., et al. |
| 5,392,914 | February 28, 1995 | Lemiueux, et al. |
| | FOREIGN PATENT DOCUMENTS | |
| FR 2,071,052 | September 17, 1971 | Generale D'Automatisme |
| DE 2,736,551 | March 2, 1978 | Oxford Labs, Inc. |
| DE 2,651,333 | May 11, 1978 | Sarstedt |
| EP 0,078,724 | May 11, 1983 | Marteau D'Autry |
| EP 0 152 120 | August 21, 1985 | Rainin Instruments Co. |
| EP 0 428 500 | May 22, 1991 | Rainin Instruments Co. |

OTHER PRIOR ART (Including Author, Title, Date, Pertinent Pages, Etc.)

Rainin Instrument Company; Rainin Product Update; March 1996 issue; entire issue.

*Fall/Winter Bio Consumer Review, 1996 issue, Powered by Katharine Glover, Ph. D., entire article (pages 12 through 14).

One common complaint involves the manner in which prior art pipettes address the hand of the user. A well designed pipette should be balanced so that it rests comfortably in the palm of the user with the majority of the weight being distributed along the length of the hand to minimize pressure spots. Another common observation involves the use of the thumb for effecting the pipette process. It is desired that a relatively small amount of thumb motion be required and that the thumb address the plunger assembly in a natural, biomechanically advantageous manner. Because pipettes frequently use disposable tips which are replaced after each use, it is also desirable to have a tip ejector which removes the old tip in a natural, biomechanically correct motion to further reduce technician operator fatigue.

The prior art listed above generally teach devices for fluid transfer that exemplify the above-discussed problems and catalog the prior art of which the applicant is aware. These references diverge starkly from the invention specifically distinguished hereinafter.

SUMMARY OF THE INVENTION

The instant invention is distinguished over the known prior art in a multiplicity of ways. For one thing, the portion of the pipette engaged by the hand of the technician is cushioned. This means that there is a soft comfortable feel discernible to the user and there will be minimum pressure build-up along the hand when contacting the pipette.

Another hallmark of the instant invention involves the location, geometry and angle of attack of the ejector which removes the disposable tip from an end of the pipette remote from the hand engaging area. In one form of the invention, an ejector tab is located strategically for manipulation by the thumb of the user. The pipette is comfortably held by means of a hilt which is draped over the index finger of the user and remains balanced in the hand with the remainder of the pipette draped against the fingers of the user. The thumb can then easily access the ejector, which when depressed actuates an ejector slide that in turn manipulates an ejector sleeve below the hand grip area to force the disposable tip off the pipette.

Another attribute of the instant invention involves the angle of attack and location of the plunger button centrally disposed upon a topmost area of the pipette, also near the thumb of the user. The plunger button is sloped towards the thumb to allow natural contact with the thumb of the user. The throw of the plunger button is relatively short and well within the natural range of motion of the thumb of a user's hand, even if the user has a small hand. In a second form of the invention, the plunger button can release the disposable tip. In a third form, a lever releases a multiplicity of tips.

Another attribute of the instant invention involves the pipette having been formed from material which allows it to be totally autoclavable. Also, since the device is formed from plastic impervious to most chemicals, it is easy to clean and maintains its precision and accuracy because it can be easily cleaned.

The geometry of the lowermost portion of the pipette body includes a narrow taper immediately adjacent the disposable tip site and therefore allows this device to be deployed with most test tubes and allows access to the bottom of these test tubes.

A further aspect implicates the pipette's ability to adjust its volumetric capacity and maintain accuracy at the same time.

In addition, the instant invention allows itself to be calibrated on site so that the reliability and reproducibility of the assays associated with the instant invention can be replicated time after time with a high degree of confidence.

OBJECTS OF THE INVENTION

Accordingly, it is a primary object of the present invention to provide a new and novel pipette according to the present invention.

A further object of the present invention is to provide a device as characterized above which is extremely durable in construction, reliable to use and maintain, and lends itself to mass production techniques.

A further object of the present invention is to provide a device as characterized above which minimizes the incidence of fatigue and trauma such as carpal tunnel syndrome, by providing an ergonomically designed pipette.

A further object of the present invention is to provide a device as characterized above which has a cushioned grip.

A further object of the present invention is to provide a device as characterized above in which the manipulation of the device takes into account the biomechanics of a person's hand and therefore allows the device to be manipulated with natural, commonly occurring range of motion manipulations.

A further object of the present invention is to provide a device as characterized above which has a narrow profile adjacent its working end that allows access into test tubes and yet still provides the ability to eject the tip with a minimal amount of effort.

A further object of the present invention is to provide a device as characterized above which is well balanced.

A further object of the present invention is to provide a device as characterized above which can be recalibrated even on site to ensure accuracy at all times.

A further object of the present invention involves the ability to adjust the volume of the pipette.

Viewed from a first vantage point it is an object of the present invention to provide a hand-held pipette comprising, in combination: a hand receiving portion having an ergonomic contour, a combination fluid inlet and outlet located adjacent the hand portion, means for introducing and dispensing fluid into and out of the pipette via the inlet and outlet, and a resilient cushion disposed along an outer periphery of the hand receiving portion to reduce fatigue and trauma to a technician operating the pipette.

Viewed from a second vantage point it is an object of the present invention to provide a pipette, comprising, in combination: a housing, a plunger disposed on the housing, a piston connected to the plunger, the plunger and piston having means for linear, reciprocal movement within the housing, a tip in fluid communication with the piston and removeably attached to the housing, and ejector means to remove the tip from the housing.

Viewed from a third vantage point it is an object of the present invention to provide a pipette method, the steps including: forming a pipette with an upper body and a lower body removeably connected to the upper body, forming a tip to removeably attach to an end of the lower body housing remote from the upper body housing, forming a plunger and piston within the pipette body and in fluid communication with the tip to draw fluid thereinto and expel fluid therefrom, forming an ejector on the lower body adjacent the tip to remove the tip from the pipette.

Viewed from a fourth vantage point it is an object of the present invention to provide a pipette, comprising, in combination: a housing, a tip connected to the housing, the tip having a bore to receive a precise amount of liquid therein, and means to adjust the amount of liquid to be received.

Viewed from a fifth vantage point it is an object of the present invention to provide a pipette, comprising, in combination: a housing, a tip connected to the housing, means to draw and expel fluid into the tip, and means to calibrate the pipette for accuracy with respect to fluid transfer.

Viewed from a sixth vantage point it is an object of the present invention to provide a pipette, comprising, in combination: an upper body having plunger means, a lower body removeably attached to the upper body having piston actuation means coupled to the plunger means, a removeable tip means coupled to the lower body, ejector means extending from the upper body to the tip means to remove the tip means, the tip means defining a multiplicity of channels.

Viewed from a seventh vantage point it is an object of the present invention to provide a pipette, comprising, in combination: an upper body having a plunger means, a lower body removeably coupled to the upper body, tip means removeably connected to the lower body influenced by the plunger means to receive and expel fluid therein, and piston means interposed between the plunger and the fluid.

These and other objects will be made manifest when considering the following detailed specification when taken in conjunction with the appended drawing figures.

DESCRIPTION OF PREFERRED EMBODIMENTS

Figure 1:
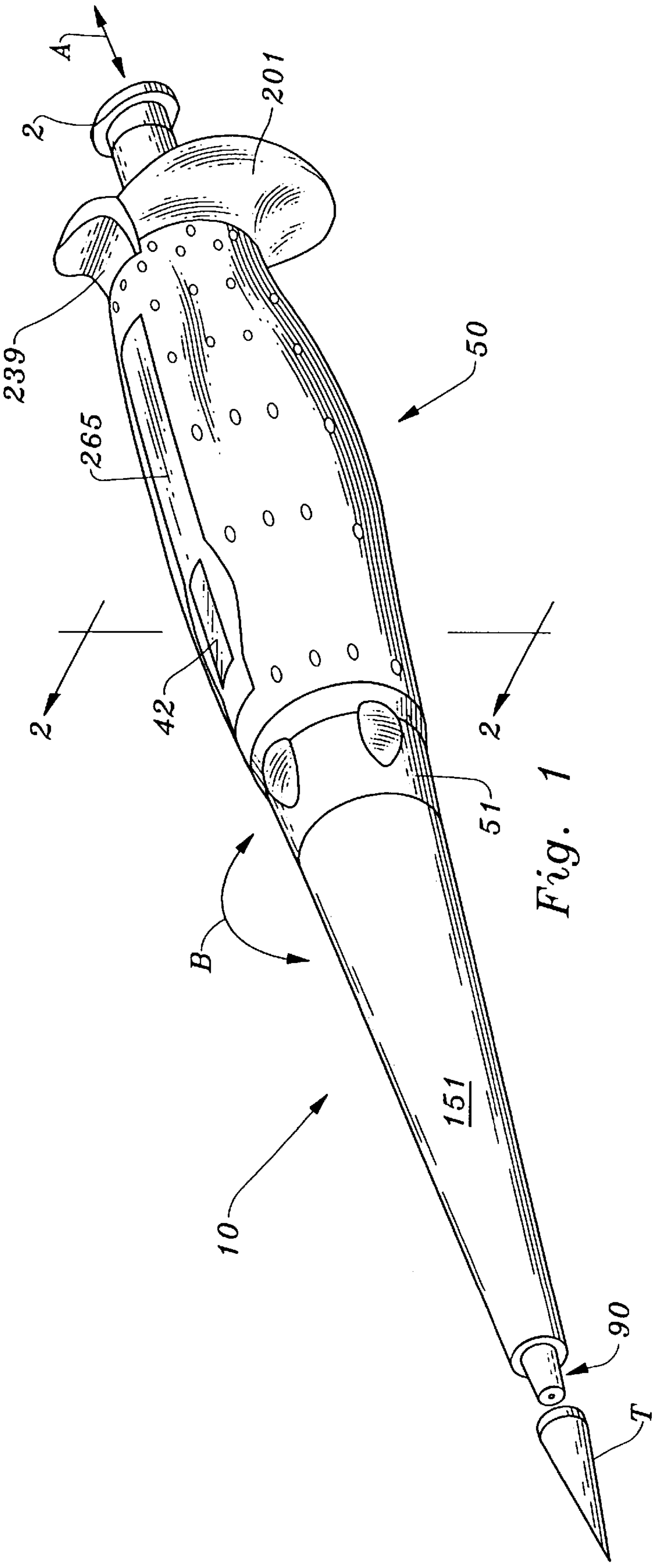
FIG. 1 is a perspective view of the apparatus according to the present invention with the tip removed.

Considering the drawings, wherein like reference numerals denote like parts throughout the various drawing figures, reference numeral 10 is directed to the pipette according to the present invention.

Figures 2, 2A, 2B:
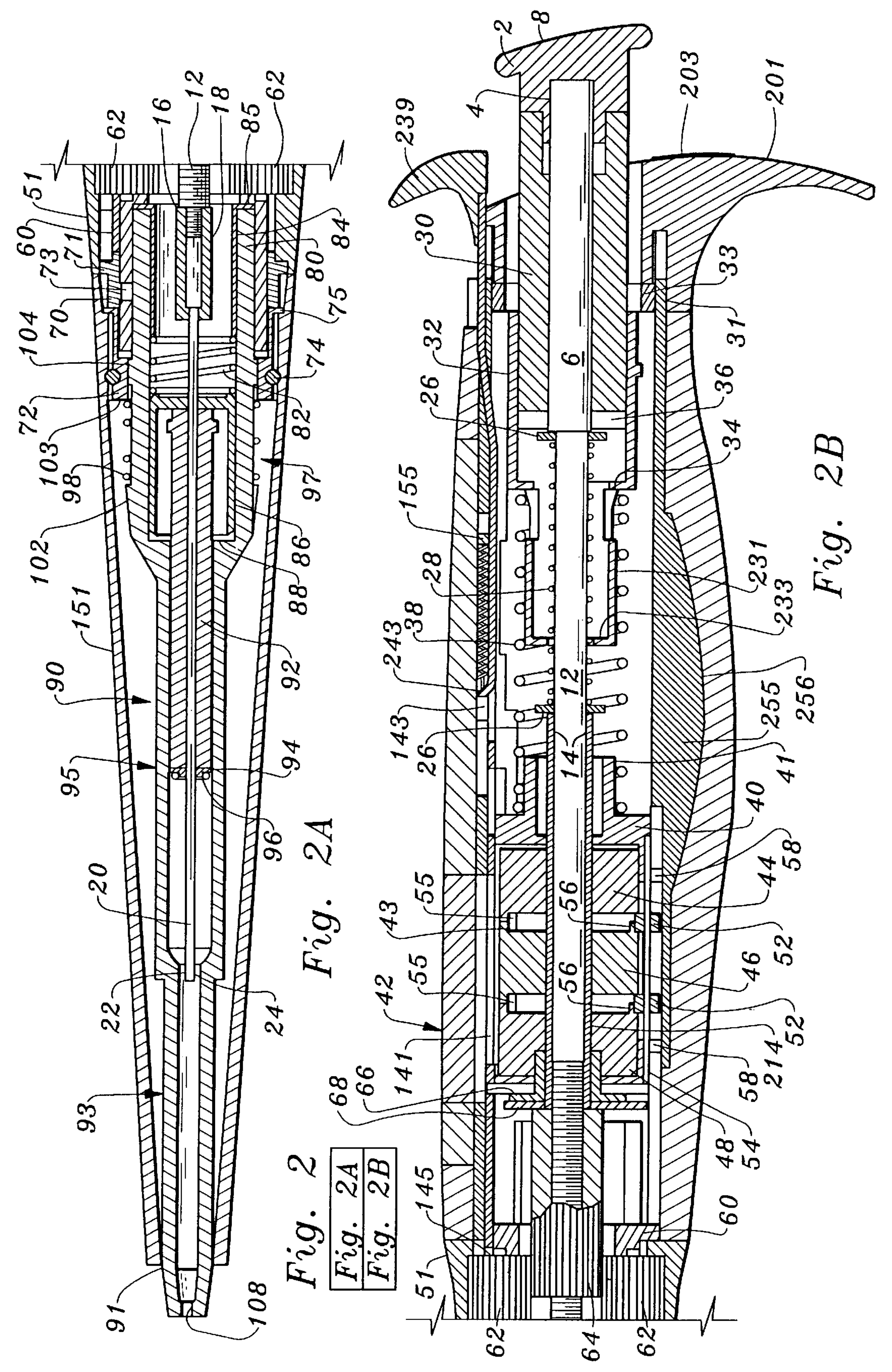
FIG. 2 is a sectional view along lines 2—2 of FIG. 1, with FIG. 2 being divided into FIGS. 2A and 2B for greater amplification.
Figure 3:
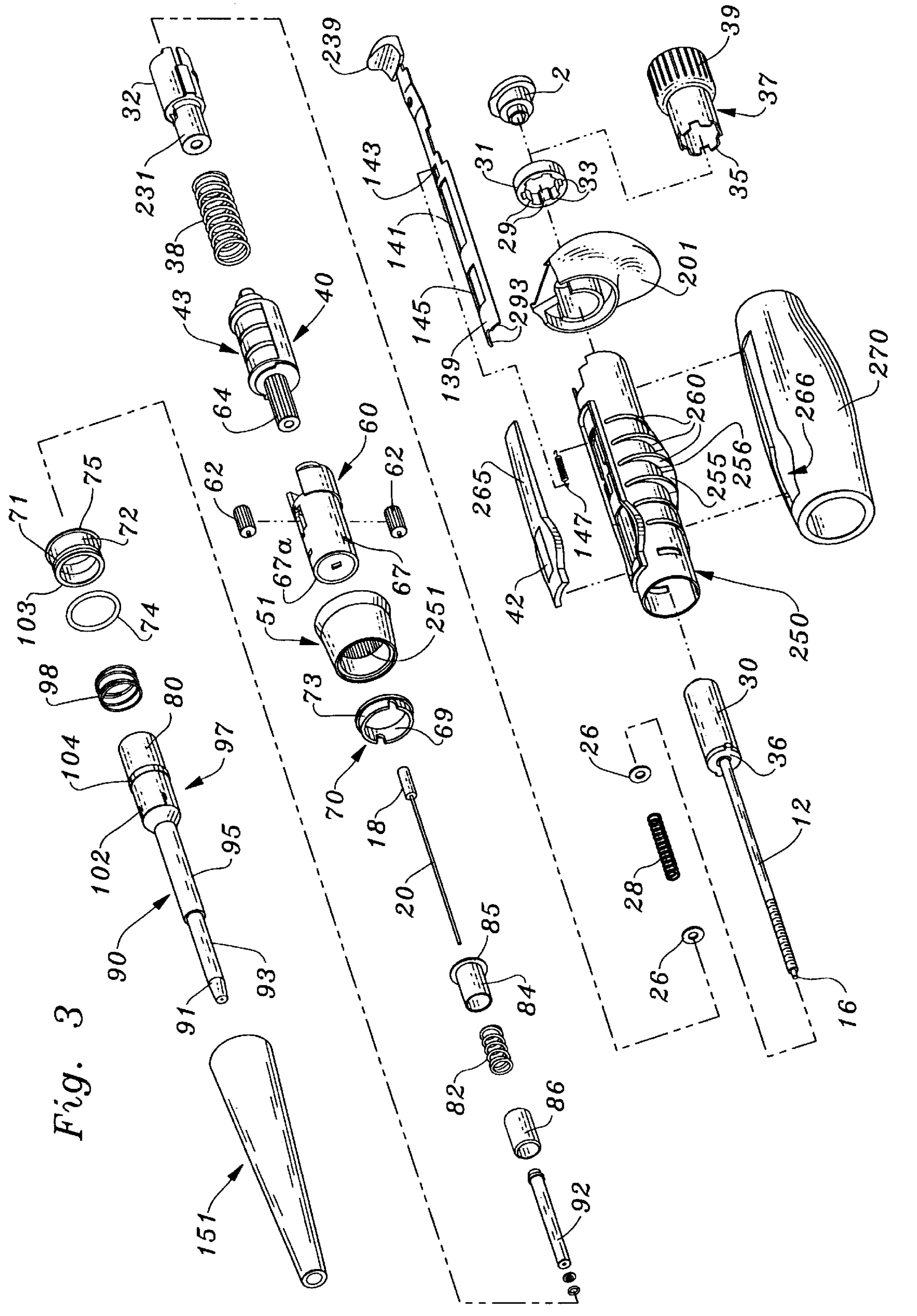
FIG. 3 is an exploded parts perspective view of that which is shown in FIGS. 1 and 2.

In its essence, the air displacement pipette 10 shown in FIGS. 1 through 3 includes an upper body 50 and a lower body 90. The lower body is surrounded by an ejector sleeve 151. An extremity of the lower body 90 remote from the upper body 50 receives a tip T thereon which ideally is the only component of the pipette 10 which comes in fluidic content with the sample being assayed. Fluid is introduced into the tip T and expelled therefrom by manipulation of a plunger cap 2 along the direction of the double ended arrow "A". Once the tip T has been used, it can be removed from the lower body 90 by manipulation of the ejector tab 239 when moved in the direction of the arrow "A" and toward the tip. In some cases, a window 42 is provided to allow one to see change in the volumetric capacity of the pipette 10 by reading a moveable scale through the window 42. Numerals corresponding to the volumetric capacity that appear in the window 42 can be changed by rotation of a volume adjuster 51 along the direction of the double ended arrows "B".

More specifically, and considering especially FIGS. 2 and 3, the following additional structure is described. As mentioned, manipulation of the plunger cap 2 along the direction of the double ended arrow "A" introduces and expels fluid from the tip T. As shown, the plunger cap has a central bore 4 allowing it to frictionally override a brake seat shaft 6. Notice that the cap 2 includes a top surface 8 which is canted so that one side is higher than the other. The lower side is oriented to face the thumb of a user and allow the thumb from the last joint upward to rest comfortably on top of the plunger cap 2 for translating the cap 2 along the direction of the double ended arrow "A".

The brake seat shaft 6 has an end remote from cap 2 which is directly and rigidly coupled to an exteriorly threaded shaft 12. Shaft 12 also moves with plunger cap displacement along the direction of the double ended arrow "A". An exterior thread of the threaded shaft 12 may coact with internal threads, to adjust sleeve 14 as will be described later. The threaded shaft 12 terminates in a set screw 16 which in turn threads into an interiorly threaded blind bore of a piston coupler 18 that is directly connected to a piston shaft 20. A terminal extremity 22 of the piston shaft 20 moves within an associated bore 24 of the lower body assembly 90 to cause fluid to be drawn into and expelled from the tip T only.

As should now be clear, axial displacement of the shaft 12 relative to the rest of the pipette 10 can effect calibration of the unit. In order to calibrate the instant invention, the plunger cap 2 is removed from the brake seat shaft 6. The shaft 6 is surrounded by and fixed to an annular brake sleeve 30. Brake sleeve 30 is girded by a calibration band 31. Band 31 has keyways 33 spaced along its inner periphery which can be accessed by keys 35 of a cylindrical calibration tool 37 (FIG. 3) which has a knurled turn head 39. Access to the band 31 allows it to be rotated and therefore allows the brake sleeve 30, shaft 6 and threaded shaft 12 to be rotated as well because threads 29 between keyways 33 coact with threads on sleeve 30 to advance the sleeve 30. This also advances the shaft 6 along the direction of the double ended arrow "A" and alters the position of the piston's terminal extremity 22 thereby allowing calibration of the pipette 10. More specifically, calibration involves: prerinsing a new tip T, making plural measurements (preferably ten) using distilled water which as—along with all other calibration items equilibrated to room temperature—and then adjusting for environmental factors, next determine the mean and standard deviation and finally adjusting the volume using calibration tool 37 as necessary. The knurling 39 on the calibration key is formed as a series of parallel lines parallel to a long axis of the calibration key 37 and offset radially to appear on an outer cylindrical surface. Each knurled line represents approximately two percent of the pipette volume. A hilt 201 on the upper body 50, near the plunger cap 2, receives a label 203 recording calibration information.

Note that the transition between the brake seat shaft 6 and the threaded shaft 12 includes a bushing 26. The bushing 26 has a counterpart where the threaded shaft 12 contacts an end of the threaded adjust sleeve 14 as shown in FIG. 2B. Captured between the two bushings 26 is a compression spring 28. This compression spring 28 urges the brake seat shaft 6 and its surrounding annular brake sleeve 30 to assume an extreme position with respect to the right-hand side of FIG. 2B. The brake sleeve 30 is a substantially cylindrical element having a central bore configured to accommodate the bearing seat shaft 6. The sleeve 30 provides a precision smoothness during axial translation of the shaft 6 via plunger 2. The brake sleeve 30 in turn is circumscribed by a dispense cage 32. The dispense cage 32 includes an abutment 34 in the form of a radially inwardly directed annular lip which coacts against a brake seat shoulder 36 disposed at an extremity of the brake sleeve 30 remote from the plunger cap 2. Once the brake seat shoulder 36 coacts against the radially inwardly directed annular lip 34, positive tactile feedback will have been provided to the technician. Further compression of only that spring 28 will have been frustrated by the shoulder's 36 contact with lip 34.

If further axial advancement of the plunger cap 2 is to occur, clearance is provided for such advancement to occur, but more work will have to be done because a second compression spring 38 must be overcome and which has a spring constant different from the first compression spring 28. Compression of the first compression spring 28 can also still occur, but the user will experience instant feedback in that more effort is required to depress the plunger cap 2 further.

The second compression spring 38 has a first end which abuts against the lip 34 of the dispense cage 32 on a side of the lip 34 opposite from the area of abutment of the brake seat shoulder 36. A second end of the compression spring 38 abuts against a counter cage 40. Both the counter cage 40 and the dispense cage 32 have ferrules 41, 231 respectively, facing inwardly towards each other and underlying the compression spring 38 to provide spring support against deflection. As shown, each ferrule is generally configured as a cylindrical sleeve extending from either the dispense cage or counter cage. However, the dispense cage ferrule 231 includes a radially inwardly extending lip 233 which provides an abutment against the bushing 26 that retains the left-hand side of the first compression spring 28 against the adjust sleeve 14. Ferrule 41, on the other hand, has an interior bore dimensioned to receive sleeve 14, but exclude bushing 26.

As noted supra, a window 42 allows visual access to an interior of the upper body 50 should the device be equipped with means to vary the effective volume that the pipette is adapted to admit and expel. The counter cage 40 includes an opening 43 in registry with window 42 so that visual access through the window 42 to counters 44, 46, 48 is unobscured. The interior of the counter cage 40 is provided with a plurality of counters. Preferably, three counters are provided and include a first counter 44, a second counter 46 and a third counter 48. The third counter reflects the "least significant digit". The counters reflect the volumetric quanta to be admitted into the tip T. Spaces on both sides of the second counter 46 accommodate counter gears 52 each of which is supported on a counter gear retainer 54. The counter gear retainer 54 is a rod like member supported at extremities by tabs 58 carried on the counter cage 40. The counter gears 52 are driven by counter cogs 56. One cog 56 is located on the third counter 48 and another cog 56 is on the second counter 46. As the third counter 48 rotates, the second counter is driven by the cog 56 of third counter 48 because it drives counter gear 52 against teeth 55 located on the second counter 46. Similarly, the cog 56 mounted on the second counter 46 turns the gear 52 and drives the teeth 55 carried on the first counter 44 and advances the first counter.

FIGS. 1, 2A and 2B show the volume adjuster 51 and its ability to reset both the counter 48 and the pipette 10 in accordance with the desired volumetric quanta to be pipetted. FIG. 3 shows internal splines 251 on the volume adjuster 51. A gear cage 60 underlies the volume adjuster 51 and supports a pair of idlers 62 for rotation in response to rotation of the splines through volume adjuster 51 in direction of the double ended arrows "B". The idlers 62 in turn coact with splines 64 overlying the threaded shaft 12. Sleeve 14 is fixed to spline 64. Thus, the adjust sleeve 14 rotates when the idlers 62 rotate. The adjust sleeve 14 preferably has an interior thread which coacts with threads on the threaded shaft 12 to cause further advancement of the threaded shaft 12 along the double ended arrow "A". In this manner, the effective volume of the pipette 10 can be adjusted by axially moving piston 20. Note that the adjust sleeve 14 passes through the gear cage 40 to drive the third counter 48. In effect a flat side on sleeve 14 drives a flat side in a bore of the third counter 48. In turn, the third counter 48 cooperates with one counter gear 52 driven by one counter cog 56 so that the next counter 46 (and then 44) can reflect the present volumetric desiderata. Note that a counter bushing 66 spaces the adjust sleeve 14 from counter cage 40 and a bearing washer 68 isolates the splines 64 from the bushing 66. This prevents binding. Because the interior of the volume adjuster 51 has teeth 251 complemental to the teeth on the idlers 62, rotation of the volume adjuster 51 along the direction of the double ended arrows "B" causes concomitant rotation of the idlers 62. Because the idlers 62 teeth mesh with the splines 64 of the threaded adjust sleeve 14, the rotation of the splines on the threaded adjust sleeve induces both axial translation of the threaded shaft 12 and motion of the counters 44, 46, 48 through the flat side 214 of threaded sleeve 14 against a flat side within the bore of third counter 48.

It should be noted that the lower body assembly 90 can be separated from the upper body assembly 50. For example, it may be desirable to substitute the lower body assembly shown in FIG. 1 with the version shown in FIG. 10 to provide a "multiple channel" capability (that is the ability to introduce and expel several columns of fluid simultaneously). To remove the lower body 90 from the upper body 50, one must overcome the friction between their interconnected coupling.

More specifically, a volume adjuster retaining sleeve 70 has a radially outwardly extending annular projection 71 which abuts against an interior terminal extremity of the volume adjuster 51. Sleeve 70 also has tabs 69 (FIG. 3) to snap into recesses 67 on gear cage 60. Sleeve 70 may also have an exterior thread 73 to threadedly connect with the FIG. 10 multiple channel unit. An O-ring retainer 72 has a portion which overlies the gear cage 60 and the retainer 70 is threaded at 73 to a part of the lower body housing 90. The portion of the retainer 70 which projects over the gear cage 60 includes a radially outwardly extending flange 75 for purposes to be assigned.

The O-ring retainer 72 supports an O-ring 74 within seat 71 to enhance the positive frictional retention between the ejector sleeve 151 and the lower body assembly 90. Note that the lower body assembly 90 is circumscribed by the ejector sleeve 151. The ejector sleeve 151 tapers along the length of the lower body and comes into tangential contact near a terminus 91 of the lower body 90 remote from the upper body 50.

The lower body 90 has three necked-down portions, the narrowest 93 being adjacent the portion of tangency with the ejector sleeve 151. Thereafter, it expands slightly to a medial portion 95 and finally to an enlarged portion 97 adjacent the upper body housing. The enlarged portion 97 includes a cylindrical exterior 80 which is grasped by one end of the gear cage 60. An interior cylindrical bore of the cylindrical exterior 80 includes a seal string 82 which is interposed between a seal cap 84 at one end adjacent the upper body 50 and a seal spacer 86 at the other end. The seal spacer 86 abuts against a shoulder 88 located within the lower body portion 90 and helps locate the seal spring 82. The seal cap 84 includes a radially, outwardly extending flange 85 which abuts against and engages a portion of the gear cage 60 as the cage itself necks down.

The purpose of the spring 82 in conjunction with the seal spacer 86 and the seal cap 84 is to positively locate the seal tube 92 within the medial necked-down portion 95 of the lower body portion 90. The seal tube 92 includes a central bore within which the piston shaft 20 reciprocates along arrow "A" as mentioned above. An end of the seal tube includes a piston seal 94 held in place by a piston seal O-ring 96. The piston shaft 20 extends to the threaded shaft 12 via piston coupler 18. The seal tube 92 has the effect of precluding contamination upstream. The piston shaft 20 is free to reciprocate within the medial portion 95 of the lower body assembly 90 as determined by plunger 2 and its movement.

Note that the enlarged portion 97 of the lower body 90 includes biasing means. A spring 98 is captured between ribs 102 located on the enlarged portion 97 of body 90 and a wall 103 located on the O-ring retainer 72. A stop 104 is provided for the O-ring retainer 72 by the lower body's enlarged portion 97 for limiting motion of the retainer 72 by ribs 102, spring 98 and stop 104.

Specifically, and with respect to both FIGS. 2A and 2B, the mechanism by which the tip T is removed from the pipette 10 can be explored. As mentioned, an ejector tab 239 is located adjacent the thumb of the user, that is ergonomically proximate to the plunger cap 2. The ejector tab 239 is connected to an arcuate ejector plate 139 (FIG. 3) which passes within the interior of the upper body portion 50 along an outer periphery. The ejector plate 139 extends into the lower body portion 90 to contact "O"-ring retainer 72 at flange 75. The ejector plate 139 includes three openings 141, 143 and 145 and a bifurcated tip 293. Opening 141 allows visual access to the counter. Opening 143 has a tang 243 for a spring 147 at its first end. Tang 155, located on the upper body 50 receives the other end of the spring 147. In this manner, when the spring 147 has been stretched by motion of the ejector tab 239 towards the tip T of the pipette 10, the spring 147 is stretched. Release of the pressure against the ejector tab 239 causes the spring 147 to force the ejector tab 239 to move back to a relaxed spring position. The bifurcated tip 293 of the ejector plate 139 contacts the flange 75 of retainer 72. Retainer 72 abuts against a portion of the ejector sleeve 151 so that depressing the ejector tab 239 causes the retainer 72 to move in a similar direction, towards the tip T. The ejector sleeve 151 overlies the lower body portion 90. Motion of the ejector sleeve 151 thereby pushes a used dispenser tip T off of a free end 108 of the lower body portion 90. Release of the ejector tab 239 removes the pressure on the ejector sleeve 151. As a consequence, pressure on spring 98 is also relaxed and is allowed to push the O-ring 74 and retainer 72 back to its unstressed state and thereby return the ejector sleeve 151 back to its original position. The interplay of springs 98, 147 and O-ring 74 provide a positive feel to the ejection process. Note that opening 145 on ejector plate overlies the idler gears 62 providing clearance. Opening 141 allows visual access to the counters 44, 46, 48.

Note the upper body 50 shown in FIG. 3. An underlying frame 250, made of rigid plastic includes at least one longitudinal rib 255 and a plurality of transverse ribs 260. The transverse ribs 260 decrease in height, as they extend along a long axis from a center of the upper body, as does the longitudinal rib 255. Each transverse rib 260 also tapers down as each rib extends away from its intersection with the longitudinal rib 255. These ribs 255, 260 become embedded in a cushioned membrane 270 which circumscribes the upper body 50 and is bonded to the upper body under heat and pressure. The highest point 256 (FIG. 2B) of both the longitudinal rib 255 and transverse ribs 260 correspond to a zone of greatest cross-sectional area of the device 10. This zone "tracks" the human hand's palm and corresponding finger area of greatest enclosed volume and complements a user's grasp at that area for comfort.

The membrane 270 deforms in the grasp of the user, accommodating differing hand sizes and reduces operator fatigue. A door 265 overlies an opening 266 formed in the membrane, the door 265 having the window 42 overlying the counter. The cushioned membrane 270 extends up to the hilt 201 of the pipette. In use, the hilt 201 is draped on the index finger so that the plunger is sloped toward the thumb. The upper body 50 hangs loosely in the hand, cushioned by membrane 270. The palm area of the hand faces the door 265 and the user's fingers comfortably grasp the cushioned membrane 270 which covers over the ribs 255, 260 so that the longer fingers of one's hand gird the zone of greatest cross-sectional area, affording comfortable support.

Figure 4:
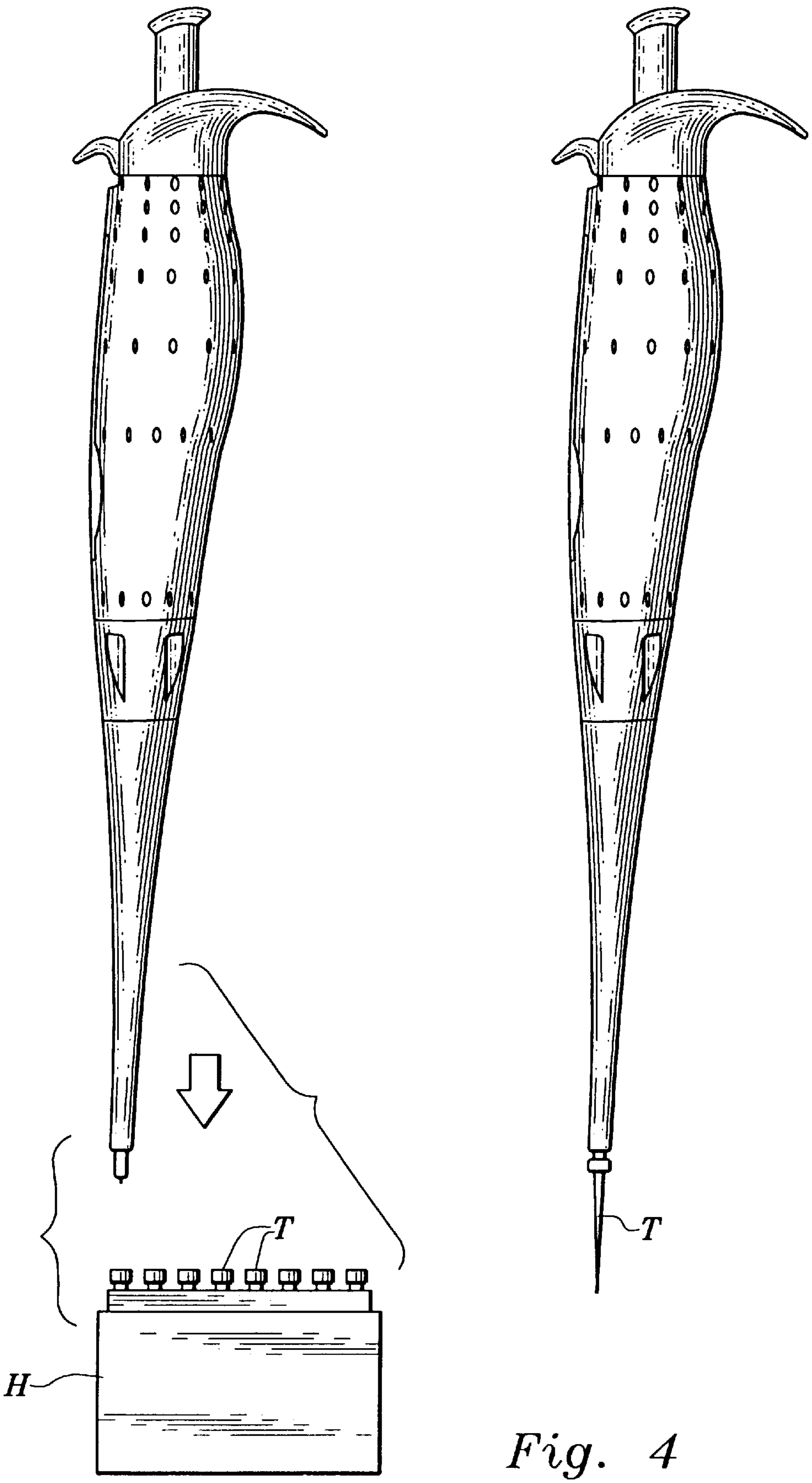
FIG. 4 is a diagrammatic depiction of the apparatus according to the present invention in use in one first step.
Figure 5:
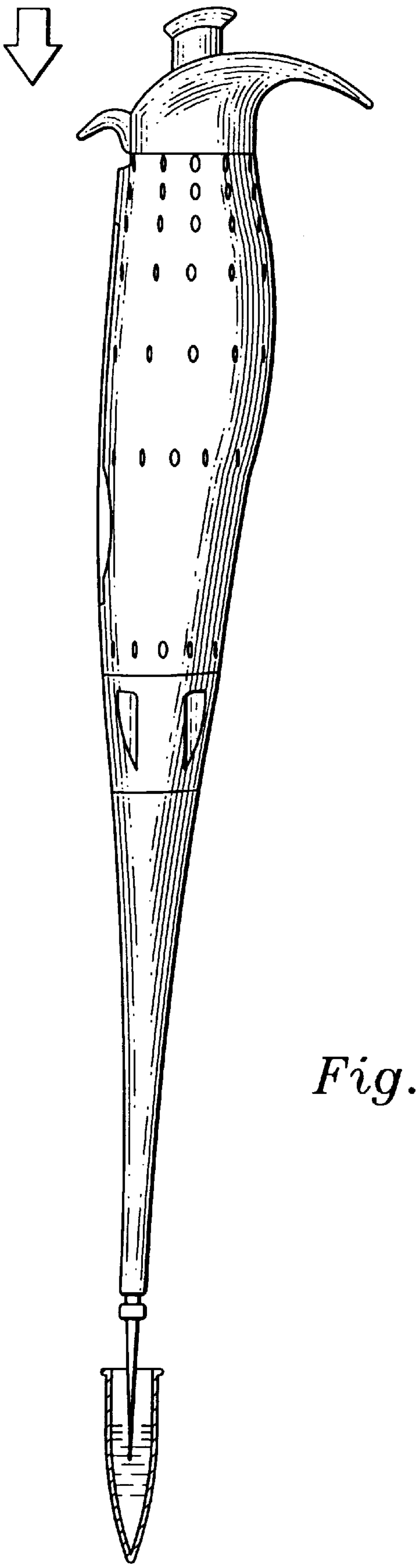
FIG. 5 is a diagrammatic depiction of the apparatus according to the present invention in use in a second step.
Figure 6:
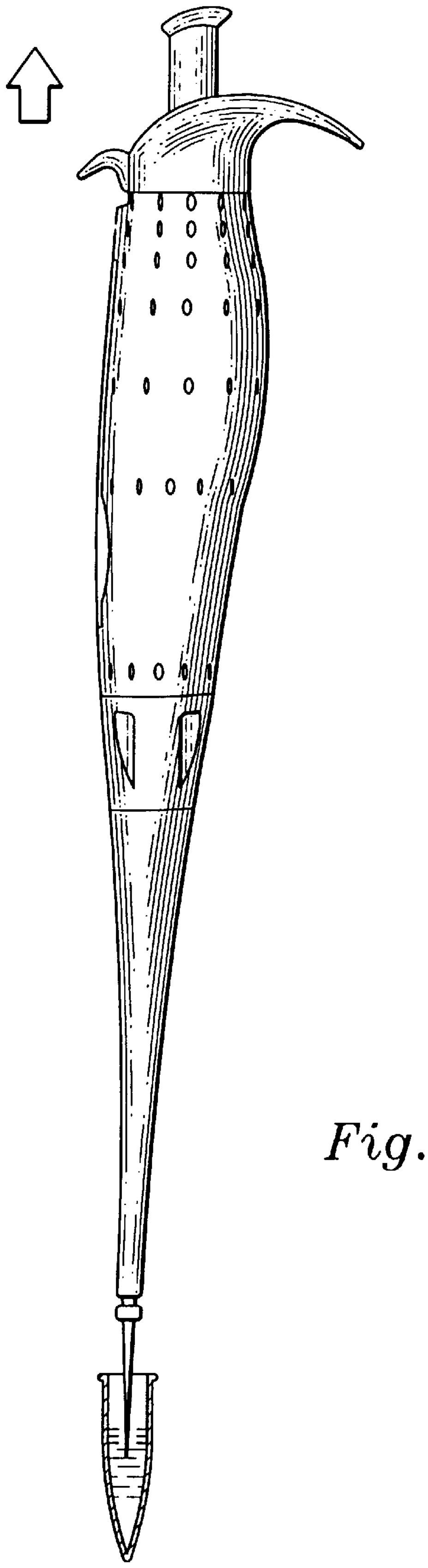
FIG. 6 is a diagrammatic depiction of the apparatus according to the present invention in use in a third step.
Figure 7:
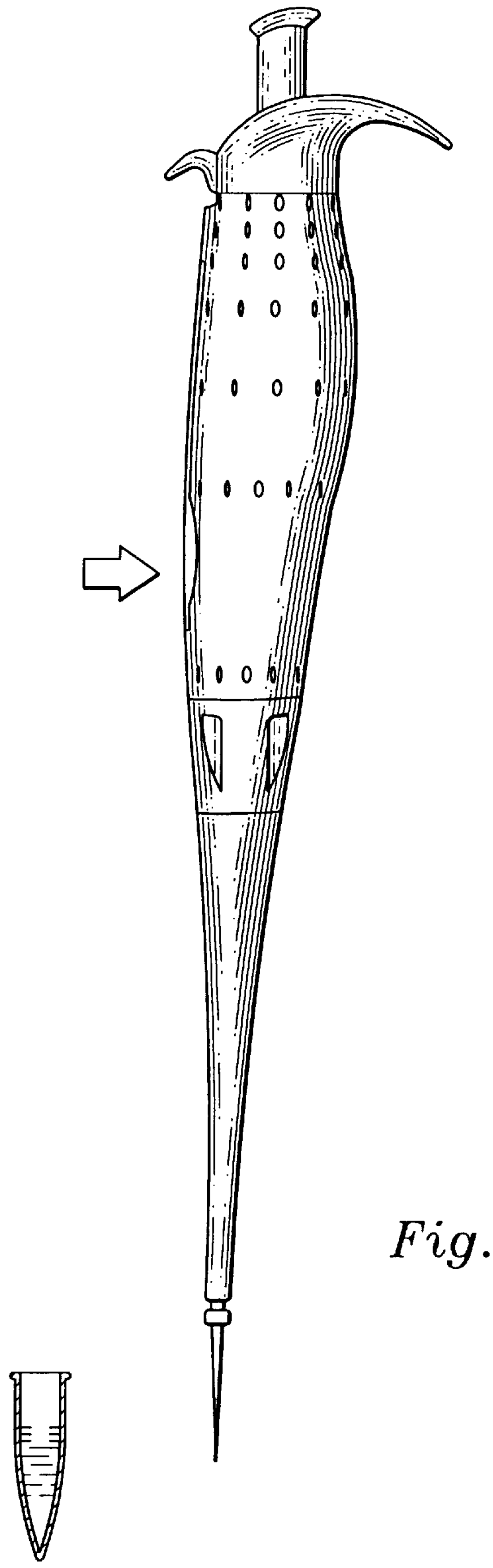
FIG. 7 is a diagrammatic depiction of the apparatus according to the present invention in use in a fourth step.
Figure 8:
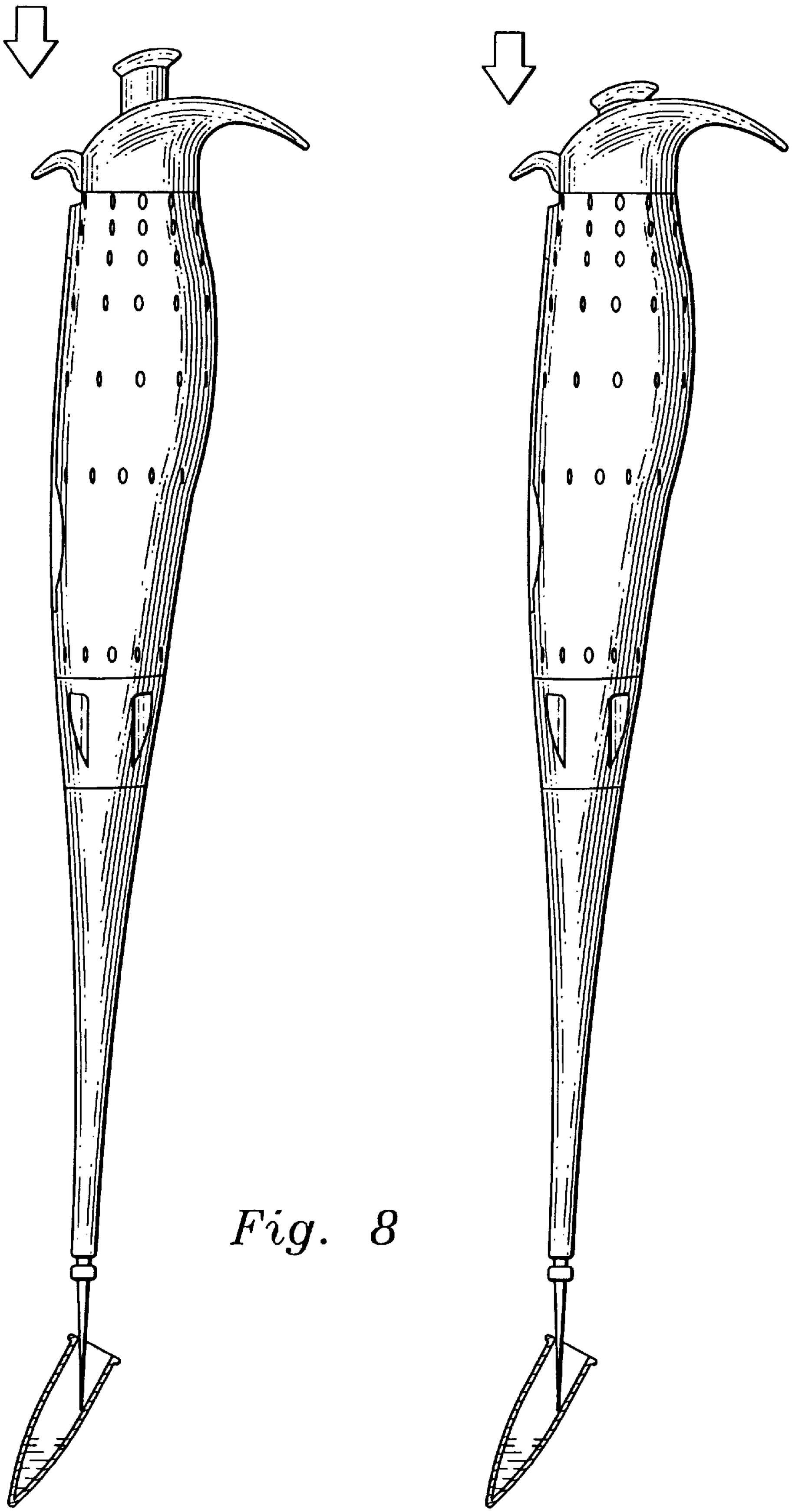
FIG. 8 is a diagrammatic depiction of the apparatus according to the present invention in use in a fifth step.
Figure 9:
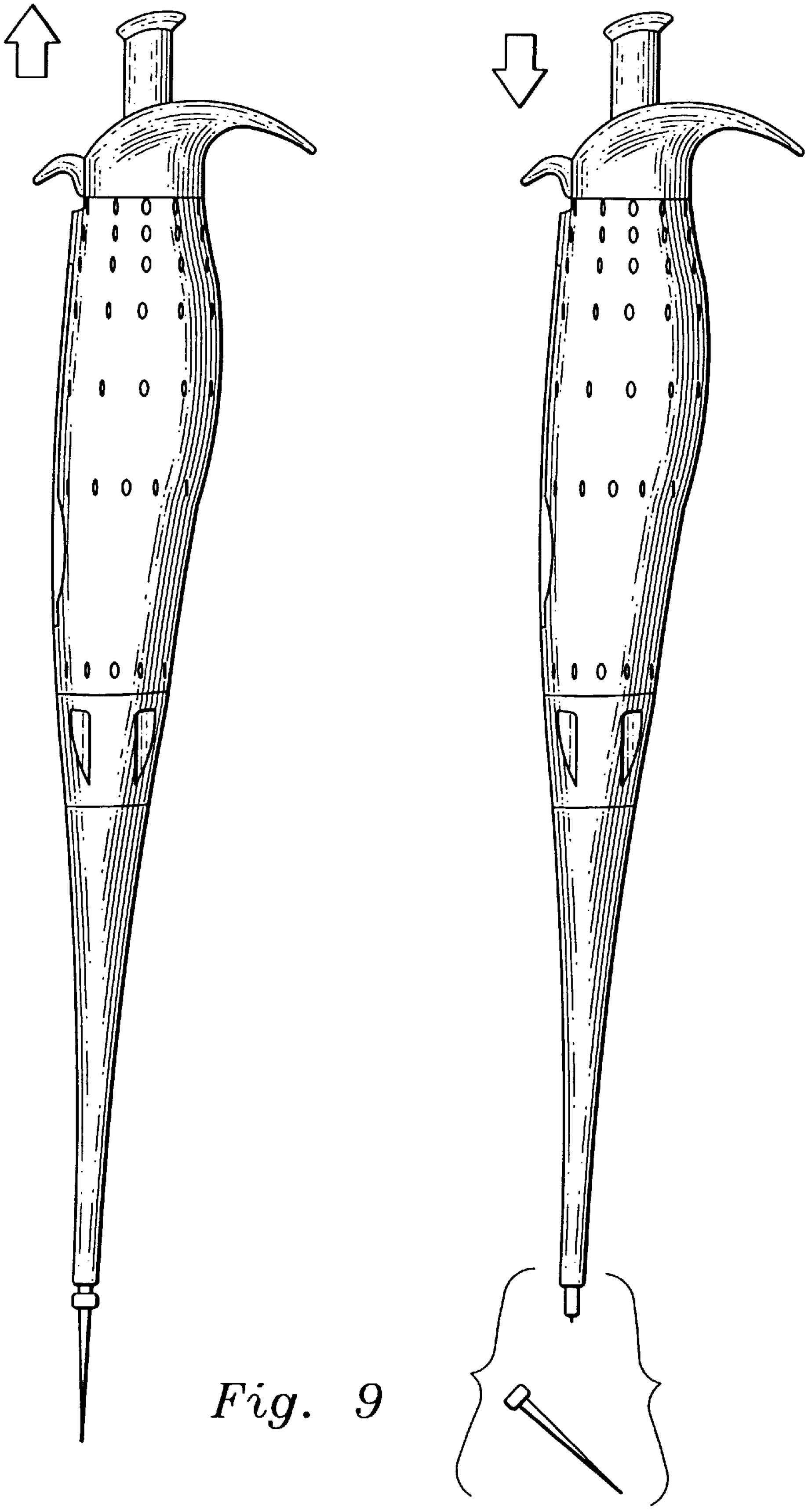
FIG. 9 is a diagrammatic depiction of the apparatus according to the present invention in use in a sixth step.

FIG. 4 (left-hand side) shows the pipette 10 prior to receiving a tip T and after having placed the tip T thereon (right-hand side). As mentioned supra, the tip T is frictionally held on the free end 108 of the lower body 90. A holder H of FIG. 4 orients a plurality of tips T so that they can be sequentially addressed by a pipette. Force in the direction of the arrow of FIG. 4 presses the tip T on the pipette 10 as shown. Next, the plunger cap 2 is depressed along the direction of the arrow of FIG. 5 and the tip T is placed within a vessel containing liquid. As shown in FIG. 6, release of the plunger cap 2 as shown by the arrow of FIG. 6 will cause liquid to be drawn into the tip T. FIG. 7 reflects the removal of the pipette 10 from the vessel along the direction of the arrow of FIG. 7. Next, the liquid is expelled in the two motions shown in FIG. 8. First, the vessel is preferably oriented such that the tip T at its extremity touches an inner vessel wall. Next, the plunger cap 2 is depressed to allow the liquid from the pipette to enter the vessel. This completes the pipetting process, and FIG. 9 shows the pipette removed from the vessel and the ejector tab 239 being manipulated to remove the tip T for a subsequent assay as per FIG. 4.

Figure 10:
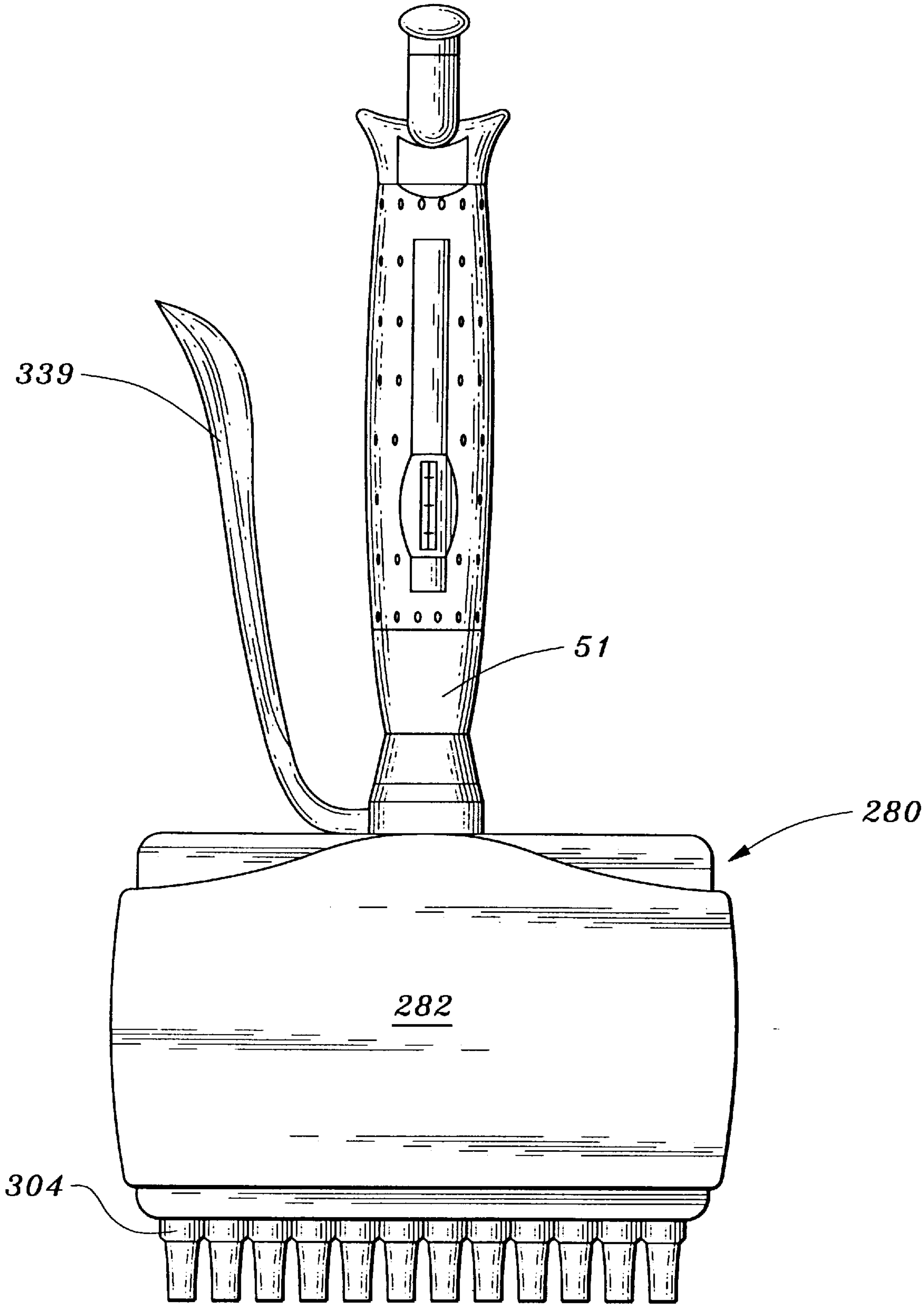
FIG. 10 is a perspective view of an alternative multiple channel accessory.
Figure 11:
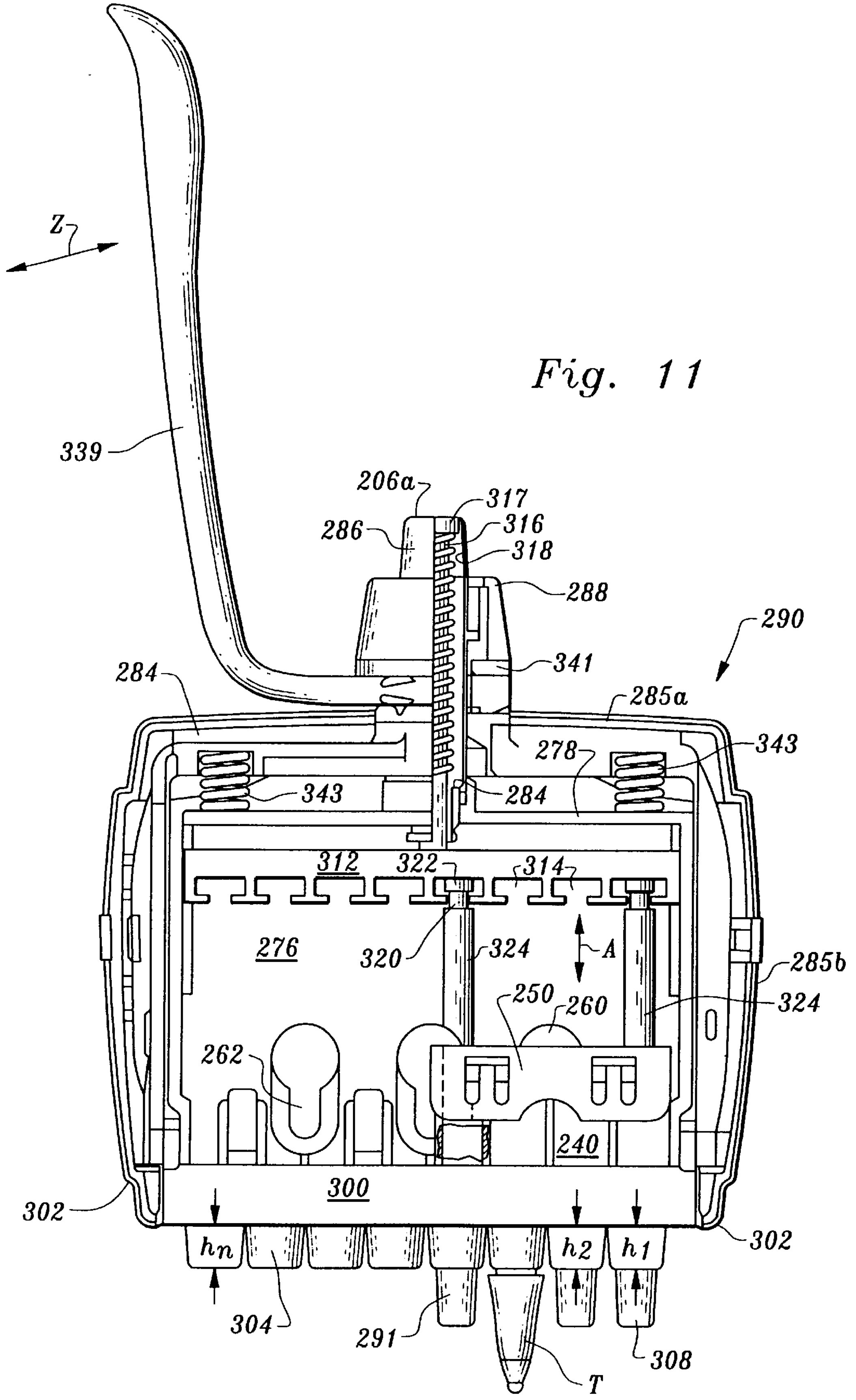
FIG. 11 is a sectional view of the accessory shown in FIG. 10.

FIGS. 10 and 11 reflect a multiple channel version of a lower body in which multiple tips can be affixed to multiple free ends 308 of the multiple channel device 290. In its essence, the multiple channel device 290 allows a multiplicity of tips T to be connected to a multiplicity of piston sleeves ("channels") within which pistons are reciprocably disposed therein so that motion of the multiplicity of pistons can allow a multiplicity of assays to occur simultaneously. Another feature involves the wholesale ejection of all of the tips once they have been used.

As shown in FIG. 11, a plurality of pistons 320 having upper piston rods 324 are to move along the direction of the double ended arrow "A". Each piston 320 is connected by a piston head 322 which has an enlarged top portion and is adapted to slide within recesses 314 formed on a header 312. The header 312 moves along the direction of the double ended arrow "A". The header 312 is threadedly connected to a drive shaft 316 which is pushed along the direction of the double ended arrow "A" when the plunger 2 (FIG. 1) is pushed.

In this embodiment, an end of the drive shaft 316 adjacent the upper body contacts the shaft 12 of FIGS. 2 and 3. The drive shaft 316 is held in fixed relationship with respect to the threaded shaft 12 by means of a surrounding body connecting sleeve 286 which has an interior thread **286*a* that fastens to an exterior thread 67*a* (FIG. 3) on the gear cage 60. This threaded connection is obscured in FIG. 10 by the volume adjust knob 51**.

An outer surface of the connecting sleeve 286 has further threads which engage a lower body adjustment ring 288 to help locate the connecting sleeve 286 longitudinally. The lower body adjustment ring 288 also provides a bearing surface against an end loop of the tip ejector lever 339 shown in FIGS. 10 and 11. The drive shaft 316 has an enlarged head 317 which captures one end of a spring 318 disposed within the connecting sleeve 286. The spring 318 cooperates with (FIG. 3) springs 28 and 38 in having the pistons 320 in a upper position along with an at rest position of the plunger cap 2. The spring 318 has an end remote from the head 317 captured by an inwardly extending flange 284 of the connecting sleeve 286. The connecting sleeve 286 is fixed to a cage 278 within which the header 312 and the pistons 320 and rods 324 reciprocate.

The cage 278 has a top wall fixed to the connecting sleeve 286 and a back wall 276 provided with a plurality of key ways 260 having slots 262. These key ways 260 and slots 262 locate and fix a plurality of piston cluster clips 250 thereto. Each cluster clip 250 is dimensioned to hold a cluster of four piston sleeves 240 in fixed relationship within the cage and its back wall 276. Thus, the piston sleeves 240 remain stationary as the pistons 320 reciprocate within bores 321 formed within the piston sleeves 240. As the pistons 320 reciprocate along the direction of the double ended arrow "A", the ejector mechanism 339 and associated cover to be described remains stationary relative thereto. After one sample has been received within each of the tips T of the multiple channel unit, these tips are to be ejected as follows.

An ejector plate 300 includes a plurality of downwardly depending ejector sleeves 302 along a bottom face thereof. The ejector plate is captured by spring clips 302 on longitudinal extremities. These spring clips 302 are integrally formed with a "U"-shaped bracket 285 which has a top wall 285*a* forming a bight portion and two legs 285*b* extending downwardly therefrom terminating in the spring clips 302. These spring clips 302 capture the ejector plate 300. When the ejector plate moves relative to the piston sleeves 240 the tips slide off of the free ends 308 of the piston sleeves 240 because of the tip's abutment against a bottom surface of the ejector sleeve 304 formed on ejector plate 300.

The ejector lever 339 has a free end that extends upwardly adjacent the upper body portion and the hand grip area. An opposite end terminates in an end loop 341 that circumscribes the sleeve 286 between the lower body adjustment ring 288 and the bight portion 285*b* of the "U"-shaped bracket 285. Moving the lever 339 in the direction of the arrow "Z" causes a camming effect pushing the "U"-shaped bracket 285 away from its adjustment ring 288. Since the ring 288 is threaded onto the sleeve 286, the bracket 285 moves away from the sleeve 286. The ejector plate 300 and the ejector sleeves 304 move downwardly vis-a-vis the free ends 308 of the piston sleeve 240, forcing the tips off. Note that the ejector sleeves 304 have heights "h" measured from the plate 300 to free ends thereof that vary. Stated alternatively, height h1 is slightly greater than height h2 which is slightly greater than . . . $h_N$. This means that the ejector lever 339 does not have to overcome the frictional force of all of the tips at one time, but rather will eject all of the tips sequentially, at one time, thereby reducing the overall force required to remove the plurality of tips. When the lever 339 is returned to a relaxed position, a pair of springs 343 urge the "U"-shaped bracket 285 back to its original position. These springs 343 are sandwiched between the cage's top surface 278 and an underside interior portion of the bight 285*b*. The bracket 285 includes top and bottom edges having lips adapted to frictionally receive a front cover 282 and a rear cover 284.

FIGS. 12 through 15 reflect a further variation of the lower body 400 and a nuance with respect to interconnecting the lower body to the upper body. In essence, the lower body shown in FIG. 12 defines a "positive displacement" type of pipette. The preceding two variations of pipettes could be characterized as "air displacement" pipettes in that a cushion of air is interposed between a working surface of the piston and the tip whereby contact with the liquid and the piston is not desired. The "positive displacement" version of FIG. 12 intends direct contact between the piston and the liquid. As a consequence, the piston of the FIGS. 12 through 15 variation is located in the removeable tip and is to be disposed within the tip.

Figure 13:
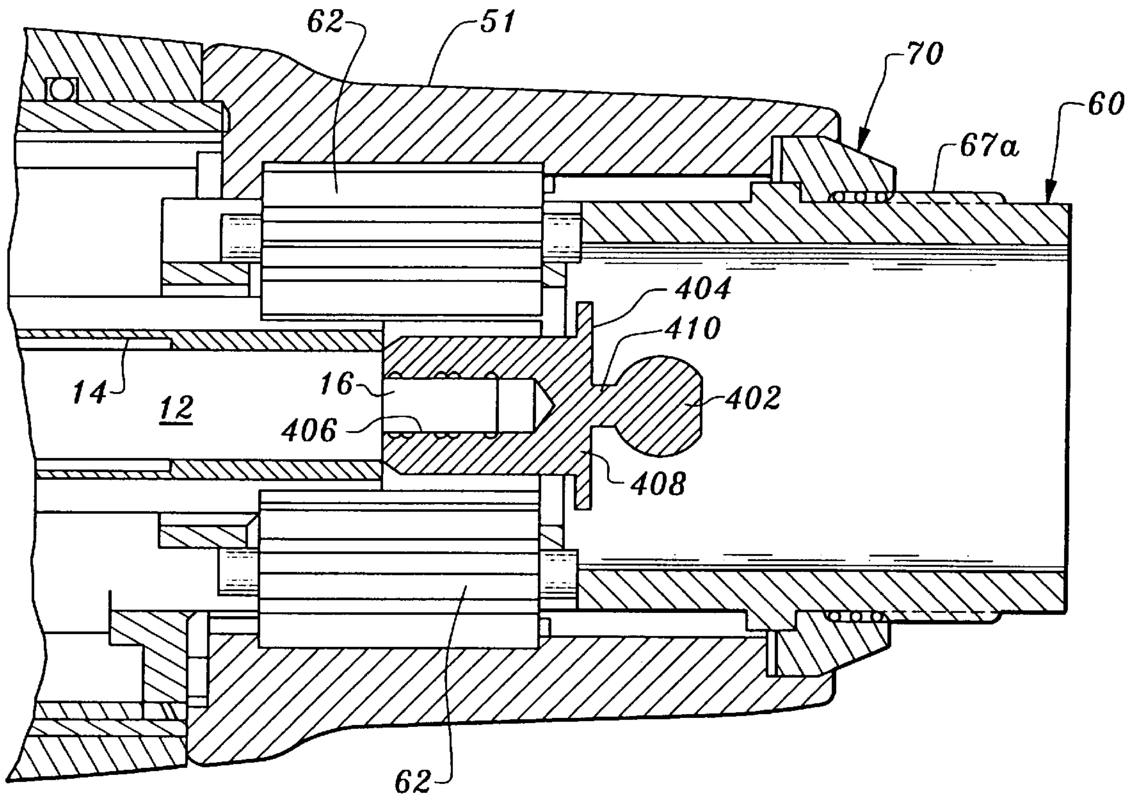
FIG. 13 shows a modification with respect to the upper body and how it connects to the lower body of FIG. 12.

Referring first to FIG. 13, the details of modification with respect to the upper body are shown. However, the parts numerals shared by the FIGS. 1 through 3 version are repeated but not belabored textually. That is, a volume adjust ring 51 as described above exists as before, as does the threaded shaft 12, adjust sleeve 14 and set screw 16. Idlers 62 are similarly shown as well as gear cage 60 and retaining sleeve 70. The other upper body parts are substantially the same.

The threaded shaft 12 and its set screw 16 are united to a ball 402. More particularly the ball 402 faces away from the threaded shaft 12 and into hollow formed by the gear cage 60. The ball 402 is provided with support by means of a ball body 408 that includes an interior bore provided with a thread 406 for complemental fastening with the set screw 16. An abutment 404 radiates from the juncture of the ball body and a ball stem 410 which extends to the ball 402.

Figure 12:
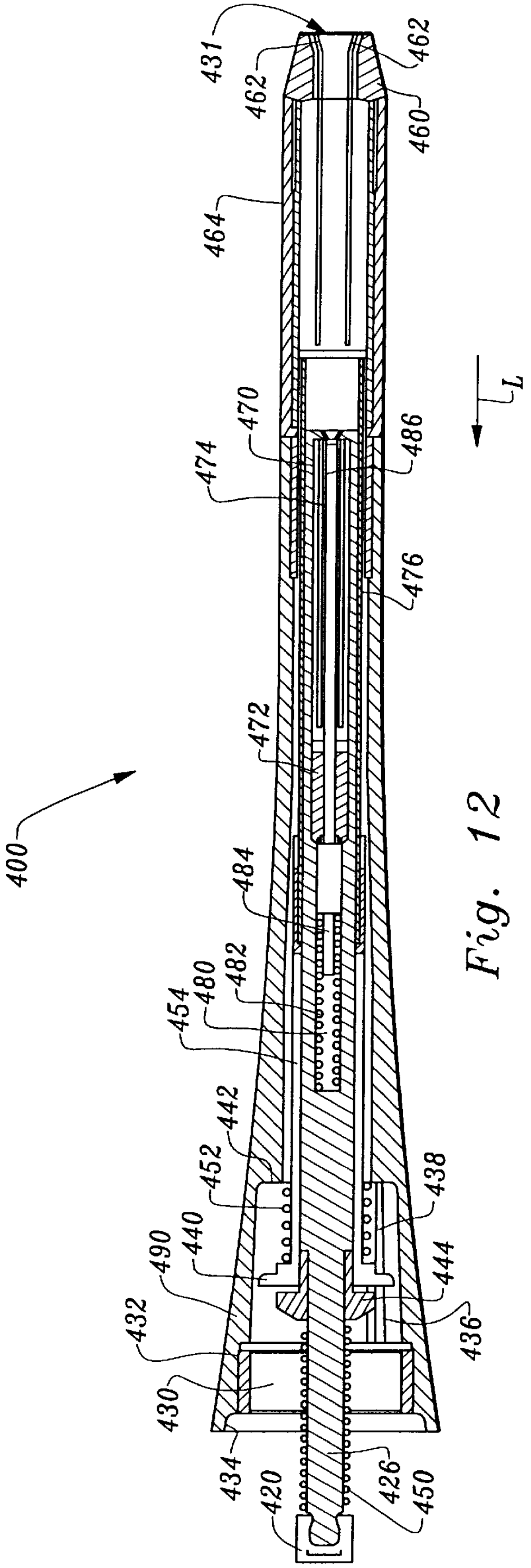
FIG. 12 is a sectional view taken along a center long axis reflecting a further variation of the apparatus according to the present invention.
Figure 14:
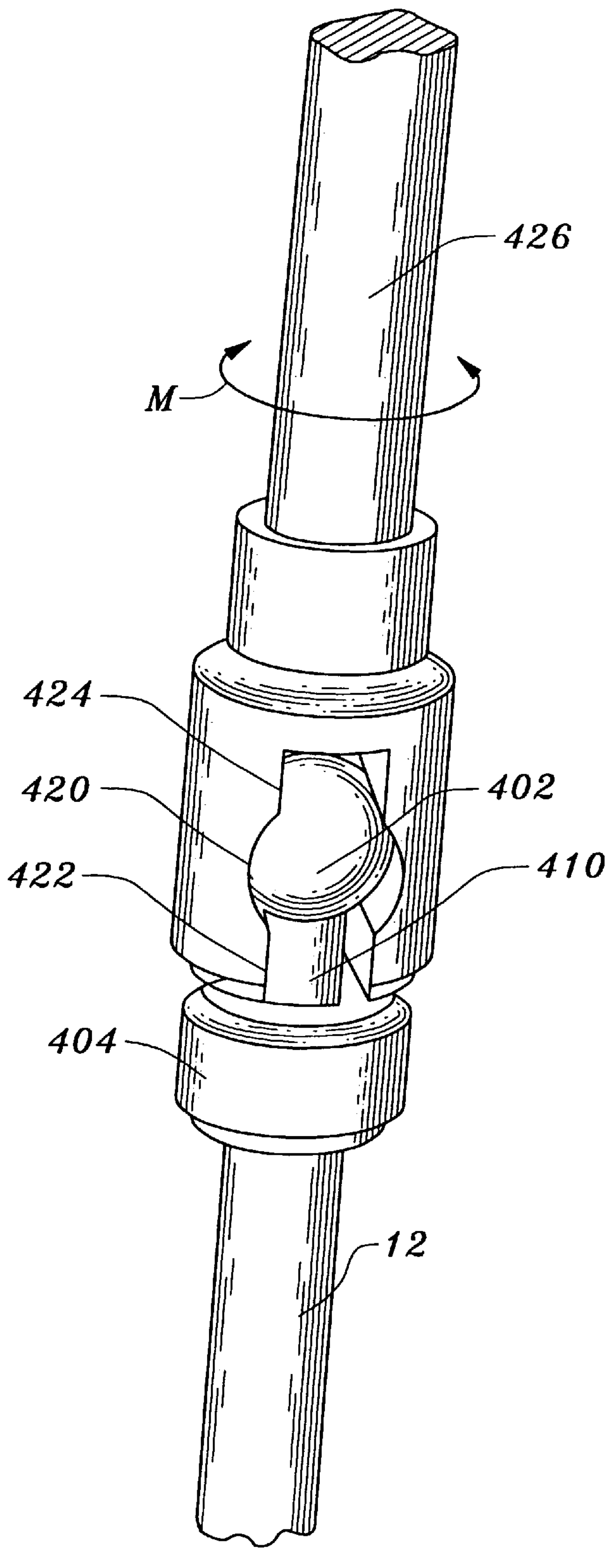
FIG. 14 is a perspective view showing the interconnection between the upper and lower body of FIGS. 12 and 13.

FIG. 14 reflects an exaggerated view of the ball 402 and its connection with a complementally formed socket 420. As shown in FIGS. 12 and 14, the socket 420 projects from one end of a stem 426 passing through a central, axially extending bore of the lower body 400. The ball 402 is received within the socket 420 through one opening in a wall. The socket 420 also includes a restrictive throat 422 which overlies the stem 410 that supports the ball 402. Another side of the socket 420 remote from the restrictive throat 422 defines a further constriction 424 similar in dimension so that the ball 402 is securely located in the socket 420 with a minimal amount of play, but allowed to move relative to socket 420. The ball and socket connection of FIG. 14 is a preferred fastening to the lower body portion 400 because the positive displacement version entails threading the housing 490 of the lower body portion to the upper body about arrow "M", FIG. 14.

More specifically, FIG. 12 shows the lower body portion 400 having (on a left-hand side thereof) an internal cavity 430 which receives the stem 426 that extends from the socket 420. This cavity includes internal threads 432 that mate with threads 67*a* (FIG. 13) located on the gear cage 60. Notice also that the relief area 434 of the recess 430 accommodates and provides clearance for retaining sleeve 70.

The recess 430 communicates all the way through the lower body portion 490 defining the bore 431. The stem 426 has a length which allows it to communicate throughout the bore. To assemble the positive displacement lower body 400 to the upper body, the ball and socket are united as shown in FIG. 14 and then the stem 426 is pressed into the bore and the threads 432 are meshed with the threads 67*a* on the gear cage 60 about arrow "M". The bore also includes a hollow 438 of less dimension and inboard from the recess 430. The hollow 438 is provided with a plurality of ribs 436 thereon. These ribs 436 cooperate with complementally formed ribs on guide 440 fixed to and overlying the stem 426. The guide 440 may be fixed on the stem by means of stop member 444 which is fixed on the stem 426. An inner collet compression spring 450 is located on the stem 426 between the stop 444 and the socket 420. An outer collet compression spring 452 is located on an opposite side of the guide 440 and abuts against a rim 442 that necks down the hollow 438.

The outer collet compression spring 452 biases the guide 440 to the left-hand side of FIG. 12. The guide 440 is integrally formed with a sleeve 454 which extends towards a free end of the positive displacement lower body remote from the handle. This sleeve 454 is connected to an outer collet gripping jaw 460 and spring 452 urges the jaw 460 to remain in the FIG. 12 retracted position, by providing a force along the direction of the arrow "L". The outer collet gripping jaw 460 when displaced in a direction opposite from the arrow "L" will splay open because it has a series of slits 462 and is formed from resilient material having a memory which causes it to diverge radially outwardly. The collet gripping jaw 460 is constrained from radial diffusion by a circumscribing outer collet sleeve 464 forming a lower end of and integrally formed with the lower body portion 490.

Similarly, an inner collet gripping jaw 470 is disposed with the bore 431 of the lower body portion 490 and is threadedly connected at 472 to the stem 426. The inner collet gripping jaws are similarly provided with a plurality of slits 474 which allow the inner collet gripping jaw 470 to splay radially outwardly when relieved from the circumscribing pressure exerted by inner collet sleeve 476 which overlies a portion of collet gripping jaw 470. The inner collect gripping jaw 470 is normally constrained to a contracted position by virtue of the inner collet compression spring 450 urging the stem 426 along the direction of the arrow "L". Both the outer collet spring 452 and the inner collet spring 450 have a spring tension which can be overcome by manipulating the plunger button 2 described in detail hereinabove.

Stem 426 also includes a central cavity 480 provided with an eject spring 482 having one end constrained by one end of the cavity 480 and another end which overlies a spring support 484 of an ejector rod 486 which is slideably disposed within an interior void of the inner collet gripping jaw 470. The ejector 486 can extend out from the interior bore of the inner collet gripping jaw 470 in a manner to be described after first describing the removable tip.

Figure 15:
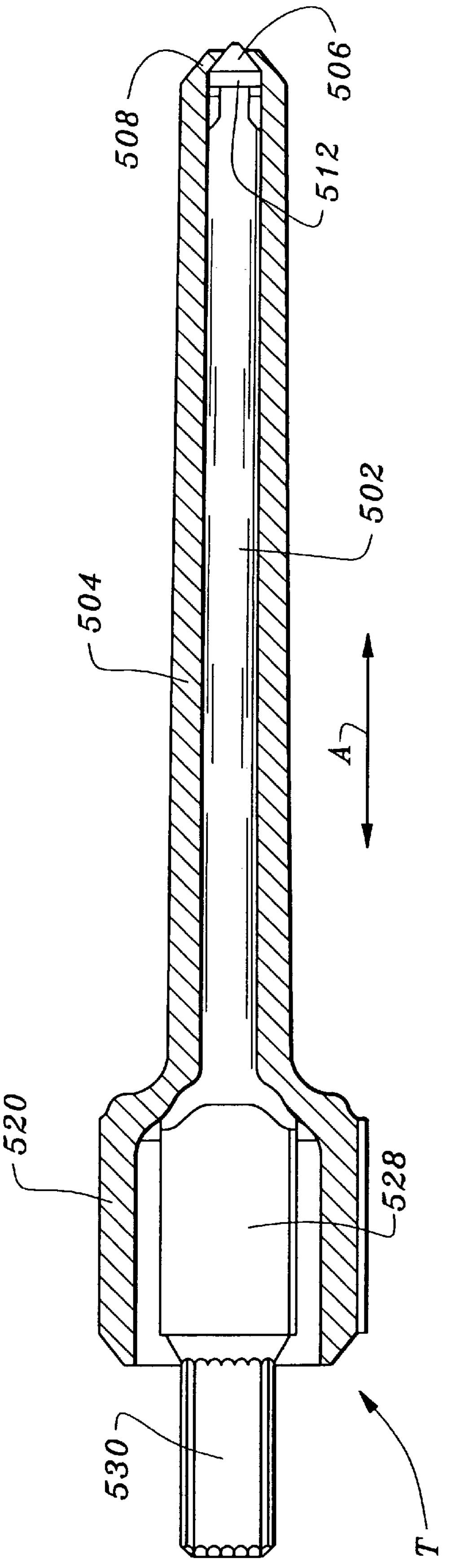
FIG. 15 shows a tip that is configured to be used with the apparatus of FIG. 12.

FIG. 15 shows that the tip T includes a piston 502 that reciprocates within a barrel 504. The piston 502 has an end 506 which communicates with a taper 508 of a barrel end such that the piston end 506 nests within the taper of the barrel end 508 to provide a close tolerance fit. A seal 512 circumscribes the piston end 506 adjacent the barrel end 508 to provide a positive seal when the piston is reciprocated along the direction of the double ended arrow "A". An upper end of the barrel 504 includes an outer collet shank 520. The exterior dimension of the outer collet shank 520 is slightly larger than an at rest inner diameter of the outer collet jaw 460 so that once the collet jaw 460 has been radially expanded and forced to overlie the outer collet shank 520, release of the pressure exerted by plunger 2 causes the outer collet jaw 460 to firmly grasp the shank 520. Similarly, the inner collet jaw 470 is dimensioned to grasp an inner collet shank 530 integrally formed with the piston 502 so that manipulation of the plunger 2 allows the inner shank 530 to be grasped by the inner collet jaw 470. Note that the barrel 504 in its transition to the shank 520 includes a necked-down portion and the piston 502 has a bulbous portion 528 underlying the outer collet shank 520 to provide a positive stop. A transition is provided between the bulbous portion 528 and the inner collet shank 530.

In use and operation of this positive displacement device, the tip T is attached by depressing the plunger button 2 of the pipette 10 so that it goes to the "second stop" i.e. compresses both springs 28, 38 in the upper body portion described hereinabove. When the plunger button 2 has been thusly depressed, both of the gripping jaws 460, 470 are open. While the plunger button 2 has been thusly depressed, the pipette is placed over a pipette tip which has been constrained from axial translation in a direction opposite the arrow "L". Typically this is performed in a rack, similar to the one shown in FIG. 4. Release of the plunger button 2 before lifting the pipette tip T out of the rack allows both the inner collet jaw 470 and the outer collet jaw 460 respectively to attach to the inner shank 530 and outer shank 520 of the tip. The tip T can now be removed from the rack. It is preferred that the plunger 2 be reactuated at this point by depressing and releasing the pipette plunger button 2 to make sure that the piston 502 is reliably captured, indicating that the shanks and the collets are firmly interconnected. Pipetting is allowed to proceed as set forth with respect to FIGS. 5 through 8. It should be observed, however, that because there is direct contact between the piston 502 and the liquid, the liquid drawn up touches the piston, in distinction with the variation of FIGS. 1 through 3 where an air cushion is interposed therebetween. Once the pipetting procedure has been completed the ejection of FIG. 9 can occur by depressing the plunger button 2 to compress springs 28, 38 so that both inner and outer collet jaws 470, 460 have been allowed to expand radially, and the ejector 486 will push the piston shank 530 out of the pipette because the ejector spring 482 advances the ejector 486.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A hand-held pipette for transferring fluid comprising, in combination:

a hand receiving portion having an ergonomic contour including a central zone of greater cross-section corresponding to a palm and finger receiving area.

a combination fluid inlet and outlet located adjacent said hand portion, means for introducing and dispensing fluid into and out of the pipette via said inlet and outlet, and a resilient cushion circumscribing an outer periphery of said hand receiving portion including said central zone of greater cross-section of said pipette to reduce fatigue and trauma to a hand of a technician operating said pipette.

2. The pipette of claim 1 further comprising:

a housing defining said hand receiving portion, a plunger disposed on said housing, a piston connected to said plunger, said plunger and piston having means for linear, reciprocal movement within said housing defining said means for introducing and dispensing fluid, a tip means in fluid communication with said piston defining said combination fluid inlet and outlet and removeably attached to said housing, and ejector means operatively coupled on said housing to remove said tip means from said housing.

3. The pipette of claim 2 further comprising:

said tip means having a bore to receive a precise amount of liquid therein, and means to adjust the amount of liquid to be received in said bore.

4. The pipette of claim 3 further comprising:

said housing having an upper body with said plunger, a lower body with means to be removeably attached to said upper body, and said ejector means extends from said upper body to said lower body to said tip means to remove said tip means.

5. The pipette of claim 3 wherein said means to adjust the amount of liquid includes piston stroke adjustment means.

6. The pipette of claim 5 wherein said piston stroke adjustment means includes a piston shaft having threads thereon interposed between said piston and said plunger, and a threaded sleeve overlying said piston shaft to allow said piston shaft to advance or retract relative thereto by piston shaft rotation.

7. The pipette of claim 6 including a calibration band having a keyway and overlying said threaded shaft and a calibration tool including a drive key to access said keyway and rotate said piston shaft.

8. The pipette of claim 6 including a volume adjuster located on an end of said hand receiving portion opposite said plunger, said adjuster including means to rotate said piston shaft, translating said piston shaft axially.

9. The pipette of claim 2 wherein said plunger and piston travel in concert by finger pressure but opposed by a first spring.

10. The pipette of claim 9 wherein said plunger and piston travel in concert by finger pressure but opposed by a second spring.

11. The pipette of claim 1 including a hilt located on one end of said hand receiving portion, said hilt having a curved surface facing said hand receiving portion which allows said pipette to be draped along an index finger on a hand of the technician.

12. The pipette of claim 1 including a hilt which projects from a side of said hand receiving portion which has a bulbous central area which locates said resilient cushion and that urges use of the pipette by orienting said bulbous area away from a palm area of the technician and underlying fingers of the technician.

13. The pipette of claim 1 including a lower body portion supporting said fluid inlet and outlet, and said lower body portion removeably attached to said hand receiving portion.

14. The pipette of claim 13 including a seal cap in said lower body and proximate a juncture between said lower body and said hand receiving portion, a seal tube overlying a piston, a spring and spacer interposed between said seal tube and said seal cap, said seal tube surrounded by said lower body and located therein by said spring and spacer, said lower body surrounded by an ejector sleeve, and removeably attached for maintenance.

15. The pipette of claim 2 including forming said pipette of autoclavable material and color coding said pipette as a function of capacity.

16. The pipette of claim 1 wherein said means for introducing and dispensing fluid includes a plunger located on a top of said hand receiving portion having a sloped top surface relative to a long axis of said hand receiving portion and sloping towards a thumb of a technician.

17. The pipette of claim 16 including a hilt extending from said top of said hand receiving portion on a side thereof adjacent a highest portion of said plunger, said hilt to be draped on an index finger of the technician.

18. A hand-held pipette comprising, in combination:

a hand receiving portion having an ergonomic contour, a combination fluid inlet and outlet located adjacent said hand portion, means for introducing and dispensing fluid into and out of the pipette via said inlet and outlet, and a resilient cushion disposed along an outer periphery of said hand receiving portion to reduce fatigue and trauma to a technician operating said pipette, wherein said hand receiving portion includes an underlying frame having at least one rib projecting therefrom to support said cushion.

19. The pipette of claim 18 wherein said frame is tubular in shape and one said rib projects radially from an outer surface of said frame longitudinally along a long axis thereof.

20. The pipette of claim 19 wherein transverse ribs are provided intersecting said rib which projects radially from said center surface of said frame longitudinally along said long axis.

21. The pipette of claim 20 wherein all said ribs taper down towards said frame away from a central area of each said rib.

22. The pipette of claim 18 wherein said rib is transverse to a longitudinal axis of said pipette.

23. The pipette of claim 22 wherein said rib tapers down towards said frame from a midpoint of said rib.

24. The pipette of claim 18 including a hilt located on one end of said hand receiving portion, said hilt having a curved surface facing said hand receiving portion which allows said pipette to be draped on a hand of the technician.

25. The pipette of claim 18 further comprising:

a housing defining said hand receiving portion, a plunger disposed on said housing, a piston connected to said plunger, said plunger and piston having means for linear, reciprocal movement within said housing defining the fluid introducing and dispensing means, a tip means in fluid communication with said piston defining said inlet and outlet and removeably attached to said housing, and ejector means operatively coupled on said housing to remove said tip means from said housing.

26. The pipette of claim 25 further comprising:

said tip means having a bore to receive a precise amount of liquid therein, and means to adjust the amount of liquid to be received in said bore.

27. The pipette of claim 26 wherein said liquid amount adjusting means includes piston stroke adjustment means.

28. The pipette of claim 27 wherein said piston stroke adjustment means includes a piston shaft having threads thereon interposed between said piston and said plunger, and a threaded sleeve overlying said piston shaft to allow said piston shaft to advance or retract relative thereto by piston shaft rotation.

29. The pipette of claim 28 including a volume adjuster located on an end of said hand receiving portion opposite said plunger, said adjuster including means to rotate said piston shaft, translating said piston shaft axially.

30. The pipette of claim 25 further comprising:

said housing having an upper body with said plunger, a lower body with means to be removeably attached to said upper body, and said ejector means extends from said upper body to said lower body to said tip means to remove said tip means.

31. The pipette of claim 25 wherein said plunger and piston travel in concert by finger pressure but opposed by a first spring.

32. The pipette of claim 18 further comprising:

means to calibrate said pipette for accuracy with respect to fluid transfer.

33. The pipette of claim 18 including a hilt located on one end of said hand receiving portion, said hilt having a curved surface facing said hand receiving portion which allows said pipette to be draped on a hand of the technician.

34. The pipette of claim 33 wherein said hilt projects from a side of said hand receiving portion which has a bulbous central area which locates said resilient cushion and that urges use of the pipette by orienting said bulbous area away from palm area of the technician and underlying fingers of the technician.

35. The pipette of claim 18 wherein a hilt projects from a side of said hand receiving portion which has a bulbous central area which locates said resilient cushion and that urges use of the pipette by orienting said bulbous area away from a palm area of the technician and underlying fingers of the technician.

36. The pipette of claim 18 wherein said fluid inlet and outlet comprises a removeable tip and means for ejecting said tip including an ejector tab located on an end of said pipette opposite said tip.

37. The pipette of claim 36 wherein said ejector tab is attached to an ejector plate, said ejector plate being elongate and curved to conform to a curved interior of said hand receiving portion.

38. The pipette of claim 37 wherein aid ejector plate urges an ejector sleeve to push said tip off, said ejector sleeve and tip located on a lower body portion which is removeably attached to said hand receiving portion.

39. The pipette of claim 18 including a lower body portion supporting said fluid inlet and outlet, and said lower body portion removeably attached to said hand receiving portion.

40. The pipette of claim 39 including a seal cap in said lower body portion and proximate a juncture between said lower body portion and said hand receiving portion, a seal tube overlying a piston, a spring and spacer interposed between said seal tube and said seal cap, said seal tube surrounded by said lower body and located therein by said spring and spacer, said lower body surrounded by an ejector sleeve, and removeably attached for maintenance.

41. The pipette of claim 18 including forming said pipette of autoclavable material and color coding said pipette as a function of capacity.

42. A hand-held pipette comprising, in combination:

a hand receiving portion having an ergonomic contour, a combination fluid inlet and outlet located adjacent said hand portion, means for introducing and dispensing fluid into and out of the pipette via said inlet and outlet, and a resilient cushion disposed along an outer periphery of said hand receiving portion to reduce fatigue and trauma to a technician operating said pipette, wherein said combination fluid inlet and outlet comprises a removeable tip and means for ejecting said tip including an ejector tab located on an end of said pipette opposite said tip, and wherein said ejector tab is attached to an ejector plate, said ejector plate being elongate and curved to conform to a curved interior of said hand receiving portion.

43. The pipette of claim 42 wherein said ejector plate urges an ejector sleeve to push said tip off, said ejector sleeve and tip located on a lower body portion which is removeably attached to said hand receiving portion.

44. The pipette of claim 43 wherein said ejector plate is biased to said hand receiving portion to remain at rest and not urging said ejector sleeve.

45. The pipette of claim 44 including a retainer interposed between said ejector sleeve and ejector plate, said retainer including an O-ring for frictional retention of said ejector sleeve thereover.

46. The pipette of claim 45 including biasing means urging said retainer and therefore said ejector sleeve against tip ejection.

47. The pipette of claim 42 further comprising:

a housing defining said hand receiving portion, a plunger disposed on said housing, a piston connected to said plunger, said plunger and piston having means for linear, reciprocal movement within said housing defining said fluid introducing and dispensing means.

48. The pipette of claim 47 further comprising:

said tip has a bore to receive a precise amount of liquid therein, and means to adjust the amount of liquid to be received in said bore.

49. The pipette of claim 42 further comprising:

means to calibrate said pipette for accuracy with respect to fluid transfer.

50. The pipette of claim 49 wherein said calibration means includes means to axially adjust a piston shaft.

51. The pipette of claim 49 further comprising:

said hand receiving portion defining a housing having an upper body with a plunger, a lower body with means to be removeably attached to said upper body, and said ejecting means extends from said upper body to said lower body to said tip to remove said tip means.

52. The pipette of claim 42 wherein said hand receiving portion includes an underlying frame having at least one rib projecting therefrom to support said cushion.

53. The pipette of claim 52 wherein said frame is tubular in shape and said rib projects radially from an outer surface of said frame longitudinally along a long axis thereof defining a longitudinal rib.

54. The pipette of claim 53 wherein plural transverse ribs are provided intersecting said longitudinal rib.

55. The pipette of claim 42 including a hilt located on one end of said hand receiving portion, said hilt having a curved surface facing said hand receiving portion which allows said pipette to be draped on a hand of the technician.

56. The pipette of claim 55 wherein said hilt projects from a side of said hand receiving portion which has a bulbous central area which locates said resilient cushion and that urges use of the pipette by orienting said bulbous area away from a palm area of the technician and underlying fingers of the technician.

57. The pipette of claim 42 wherein a hilt projects from a side of said hand receiving portion which has a bulbous central area which locates said resilient cushion and that urges use of the pipette by orienting said bulbous area away from a palm area of the technician and underlying fingers of the technician.

58. The pipette of claim 42 wherein said ejector tab is located on an end of said pipette opposite said tip and pushes a bifurcated end of said ejector plate to release said tip.

59. The pipette of claim 42 wherein said means for introducing and dispensing fluid includes a plunger and a piston which travel in concert by finger pressure but opposed by a first spring.

60. The pipette of claim 59 wherein said plunger and piston which travel in concert by finger pressure are opposed by a second spring.

61. The pipette of claim 42 including liquid amount adjusting means.

62. The pipette of claim 61 including piston stroke adjustment means defined by a piston shaft having threads thereon interposed between a piston and a plunger, and a threaded sleeve overlying said piston shaft to allow said piston shaft to advance or retract relative thereto by piston shaft rotation.

63. The pipette of claim 62 including a calibration band having a keyway and overlying said threaded piston shaft and a calibration tool including a drive key to access said keyway and rotate said piston shaft.

64. The pipette of claim 63 including a dispense cage surrounding a portion of said piston shaft and providing an abutment to limit piston shaft travel.

65. The pipette of claim 42 including a lower body portion supporting said fluid inlet and outlet, and said lower body portion removeably attached to said hand receiving portion.

66. The pipette of claim 42 including forming said pipette of autoclavable material and color coding said pipette as a function of capacity.

* * * * *